(12) United States Patent
Kawamura

(10) Patent No.: US 9,007,697 B2
(45) Date of Patent: Apr. 14, 2015

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/100,036

(22) Filed: Dec. 9, 2013

(65) Prior Publication Data

US 2014/0092485 A1    Apr. 3, 2014

Related U.S. Application Data

(63) Continuation of application No. PCT/JP2012/003693, filed on Jun. 6, 2012.

(30) Foreign Application Priority Data

Jun. 24, 2011 (JP) .................................. 2011-140026

(51) Int. Cl.
```
G02B 15/177    (2006.01)
G02B 15/14     (2006.01)
G02B 15/16     (2006.01)
G02B 13/00     (2006.01)
```

(52) U.S. Cl.
CPC .............. *G02B 15/177* (2013.01); *G02B 15/16* (2013.01); *G02B 15/14* (2013.01); *G02B 13/009* (2013.01)

(58) Field of Classification Search
CPC ....... G02B 15/177; G02B 15/16; G02B 15/14
USPC .......................................... 359/684, 691, 692
See application file for complete search history.

(56) References Cited

U.S. PATENT DOCUMENTS

| | | |
|---|---|---|
| 2005/0200970 A1 | 9/2005 | Nose et al. |
| 2007/0121215 A1 | 5/2007 | Sekita |
| 2007/0171544 A1 | 7/2007 | Noda |
| 2008/0158690 A1 | 7/2008 | Eguchi |

(Continued)

FOREIGN PATENT DOCUMENTS

| | | |
|---|---|---|
| JP | 2005-258067 | 9/2005 |
| JP | 2006-039182 | 2/2006 |

(Continued)

OTHER PUBLICATIONS

NPL International Preliminary Report on Patentability (PCT/IB/373) prepared for PCT/JP2012/003693 on Dec. 24, 2013.*

(Continued)

*Primary Examiner* — David N Spector
(74) *Attorney, Agent, or Firm* — Young & Thompson

(57) ABSTRACT

A zoom lens includes: a first lens group having a negative refractive power; and a second lens group having a positive refractive power, provided in this order from an object side. The first lens group includes a first lens having a negative refractive power and a second lens, which is plastic, having a positive refractive power. The zoom lens satisfies the following conditional formulae, when Nd1n is the refractive index of the first lens with respect to the d line, Nd1p and vd1p are the refractive index and the Abbe's number of the second lens with respect to the d line, respectively, d2 is the spatial distance between the first lens and the second lens along an optical axis, and fw is the focal length of the entire system at the wide angle end: $1.48 < Nd1n < 1.71$ (1); $1.60 < Nd1p < 1.65$ (2); $18 < vd1p < 25$ (3); and $0.2 < d2/fw < 0.5$ (4).

9 Claims, 17 Drawing Sheets

(56) References Cited

U.S. PATENT DOCUMENTS

| | | |
|---|---|---|
| 2009/0009883 A1 | 1/2009 | Wada |
| 2011/0096407 A1 | 4/2011 | Ohata et al. |
| 2012/0044577 A1 | 2/2012 | Kato et al. |
| 2012/0050884 A1 | 3/2012 | Kurashige et al. |
| 2012/0050886 A1 | 3/2012 | Masugi |
| 2012/0069451 A1 | 3/2012 | Nakamura |
| 2012/0113312 A1 | 5/2012 | Yanai et al. |
| 2014/0111869 A1* | 4/2014 | Kawamura .................. 359/680 |
| 2014/0111870 A1* | 4/2014 | Kawamura .................. 359/684 |

FOREIGN PATENT DOCUMENTS

| | | |
|---|---|---|
| JP | 2007-025373 | 2/2007 |
| JP | 2007-155836 | 6/2007 |
| JP | 2007-187740 | 7/2007 |
| JP | 2007-193140 | 8/2007 |
| JP | 2008-058600 | 3/2008 |
| JP | 2008-181118 | 8/2008 |
| JP | 2008-257179 | 10/2008 |
| JP | 2010-091948 | 4/2010 |
| JP | 2011-095328 | 5/2011 |
| JP | 2012-042811 | 3/2012 |
| JP | 2012-053222 | 3/2012 |
| JP | 2012-053223 | 3/2012 |
| JP | 2012-068327 | 4/2012 |
| JP | 2012-098459 | 5/2012 |
| JP | 2012-103416 | 5/2012 |
| JP | 2012-103675 | 5/2012 |

OTHER PUBLICATIONS

International Search Report PCT/JP2012/003693 dated Oct. 2, 2012, with English Translation.

* cited by examiner

FIG.1 EXAMPLE 1
A WIDE ANGLE END
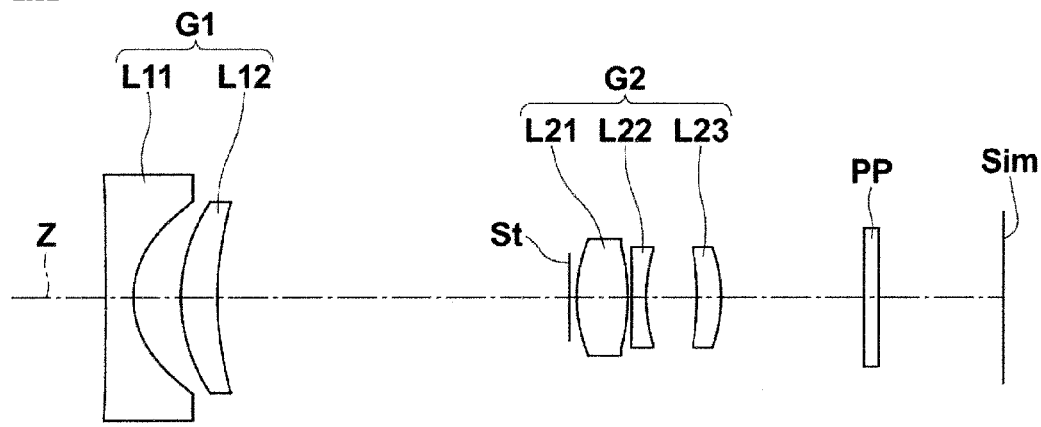
B TELEPHOTO END
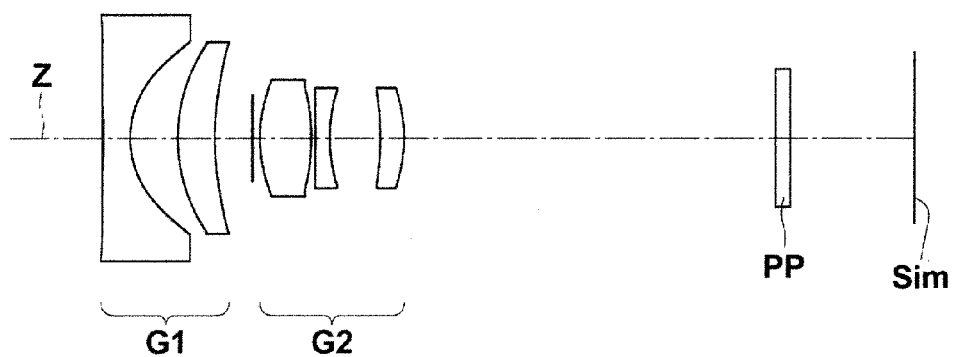

FIG. 2
EXAMPLE 2
A
WIDE ANGLE END
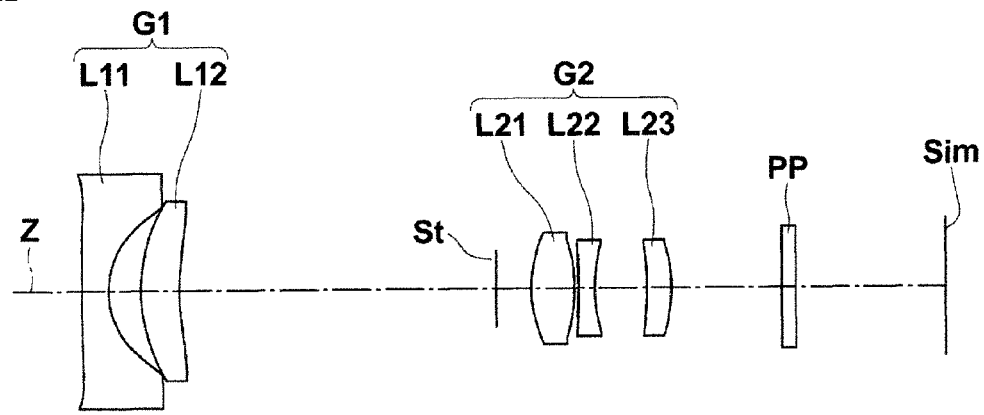
B
TELEPHOTO END
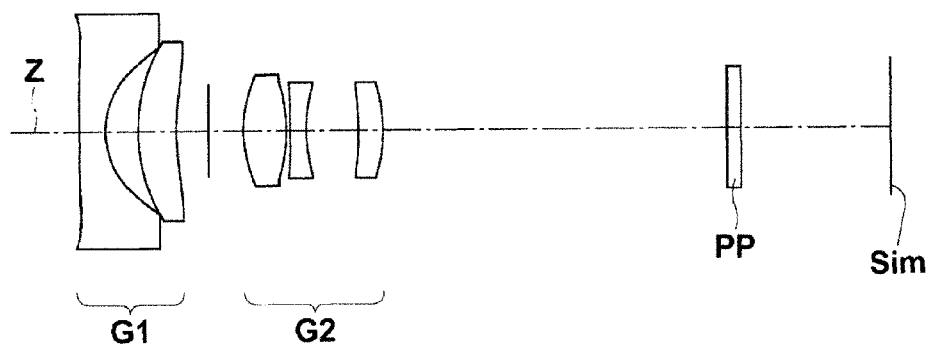

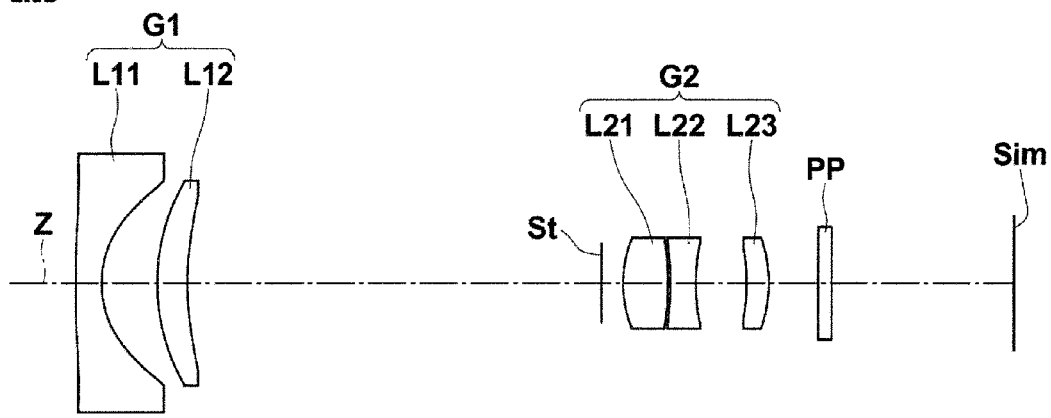
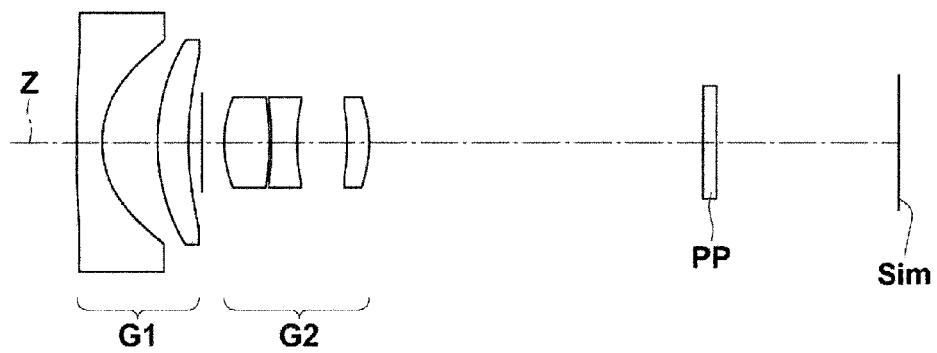
FIG. 3 EXAMPLE 3
A WIDE ANGLE END
B TELEPHOTO END

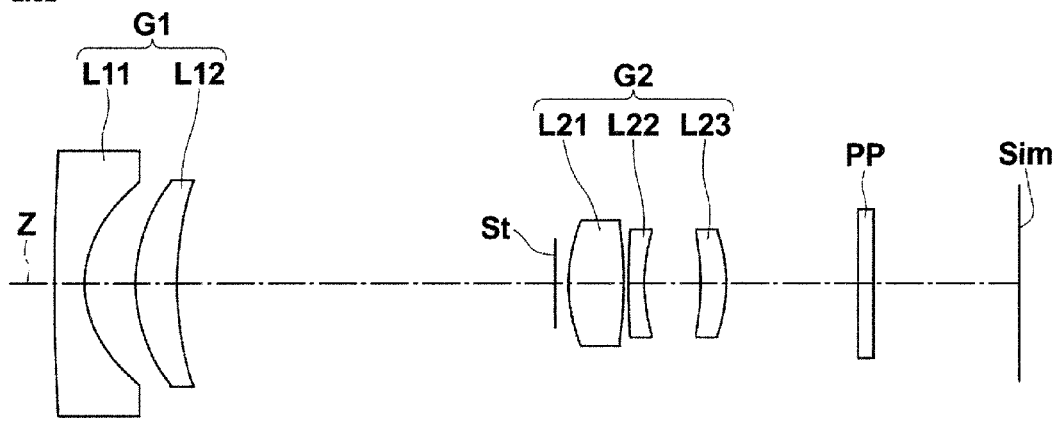
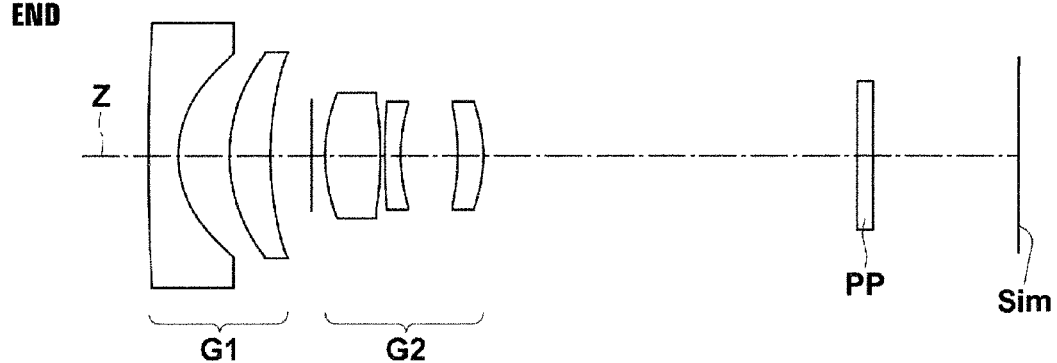
FIG.4 EXAMPLE 4

FIG.5 EXAMPLE 5
A WIDE ANGLE END
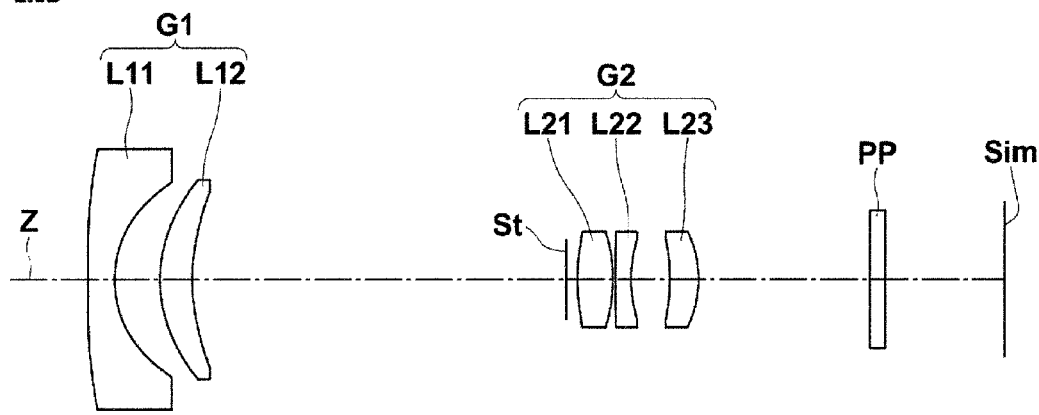
B TELEPHOTO END
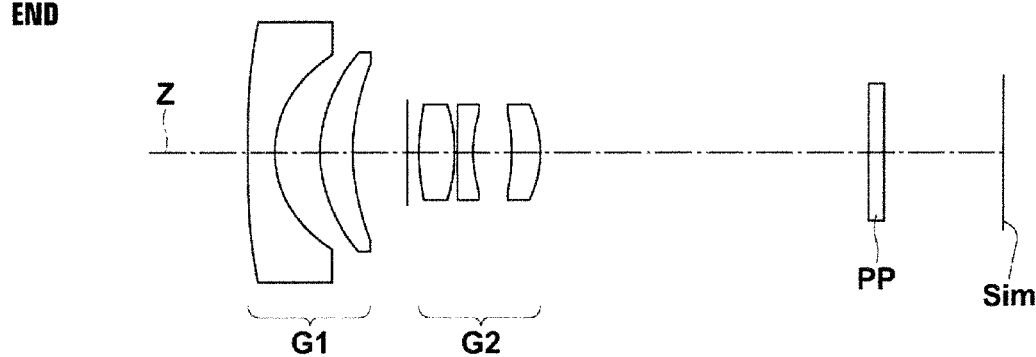

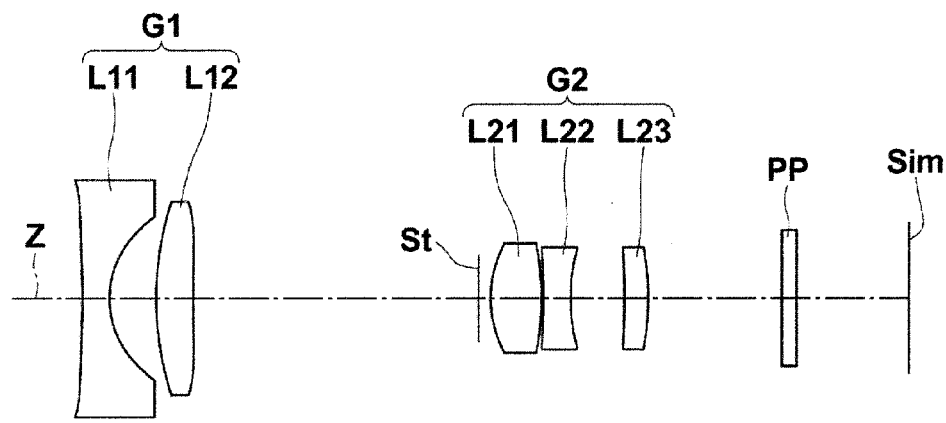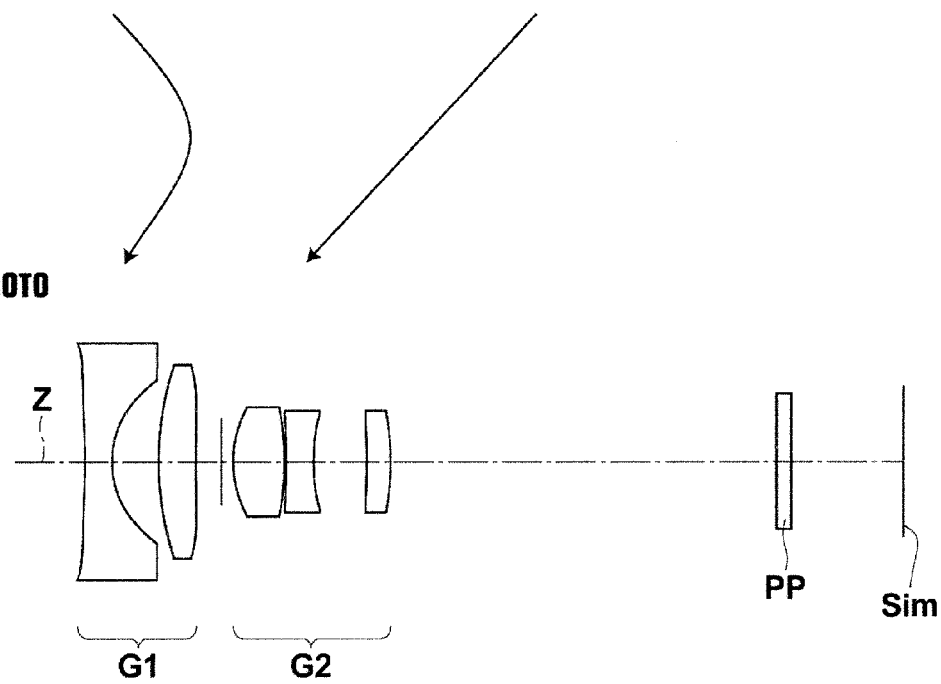
FIG.6 EXAMPLE 6

EXAMPLE 7 FIG. 7
A WIDE ANGLE END
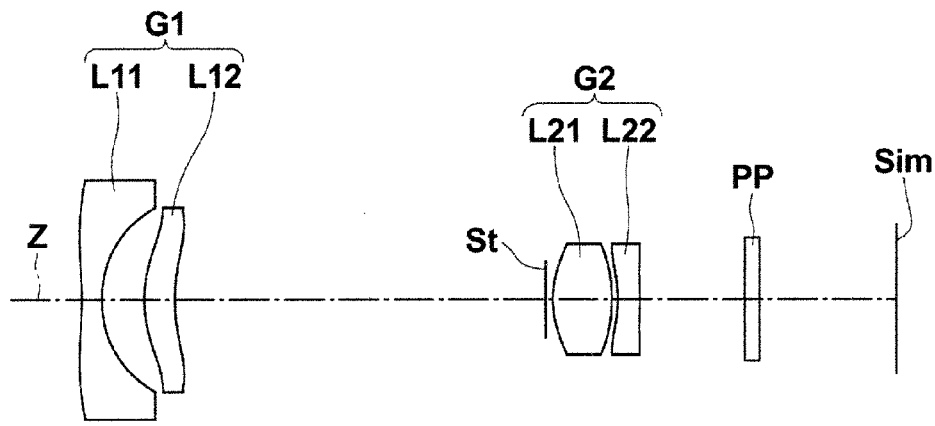
B TELEPHOTO END
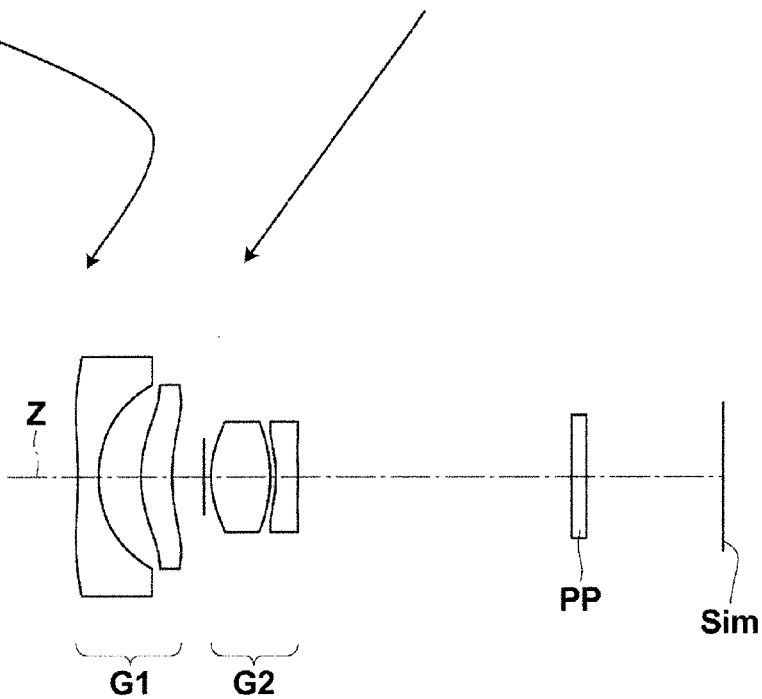

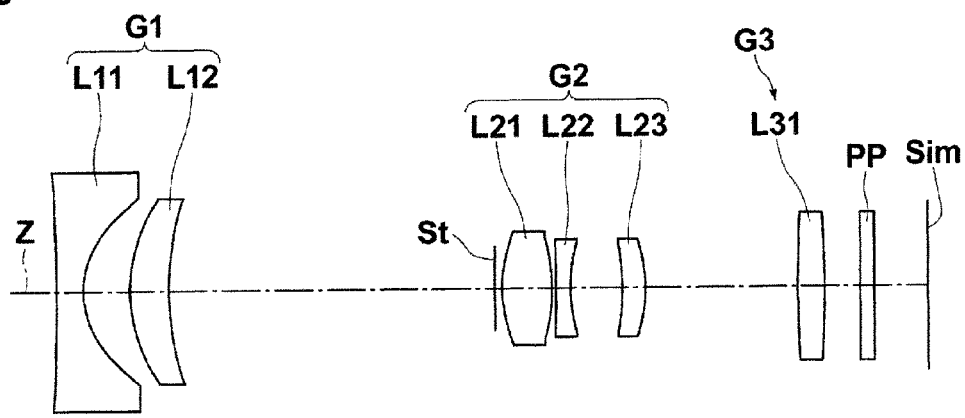
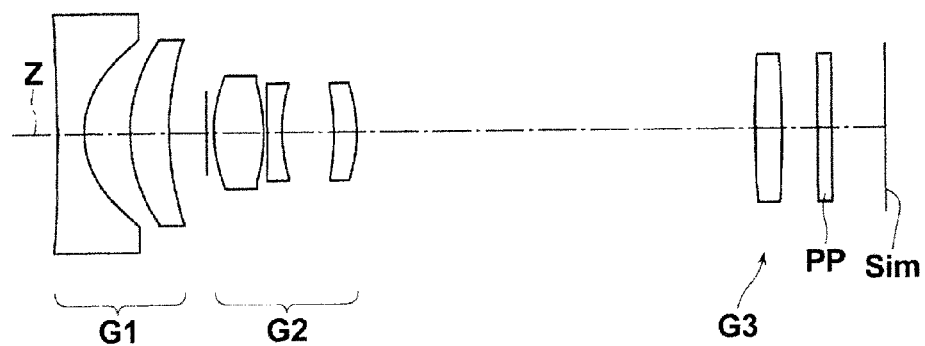
FIG. 8 EXAMPLE 8
A WIDE ANGLE END
B TELEPHOTO END

FIG.9
EXAMPLE 1
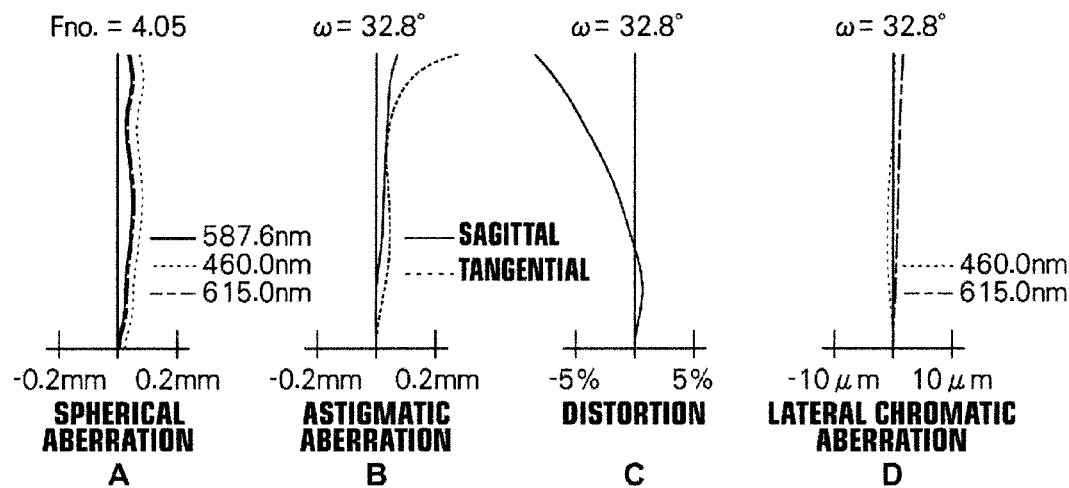
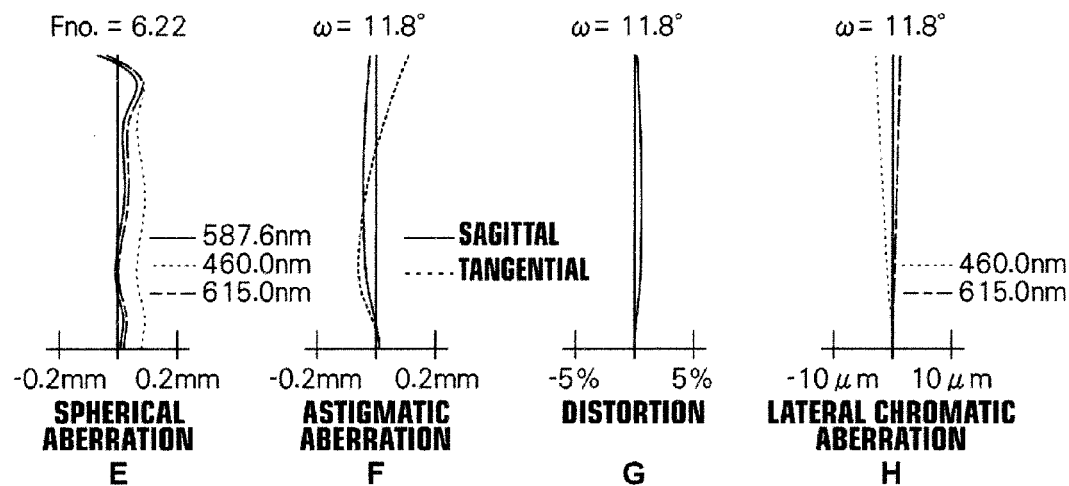

FIG.10
EXAMPLE 2
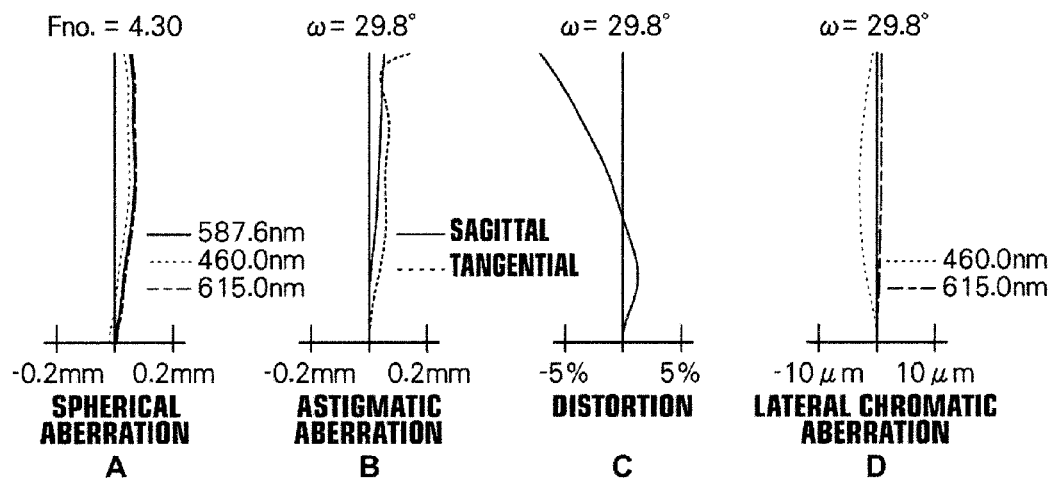
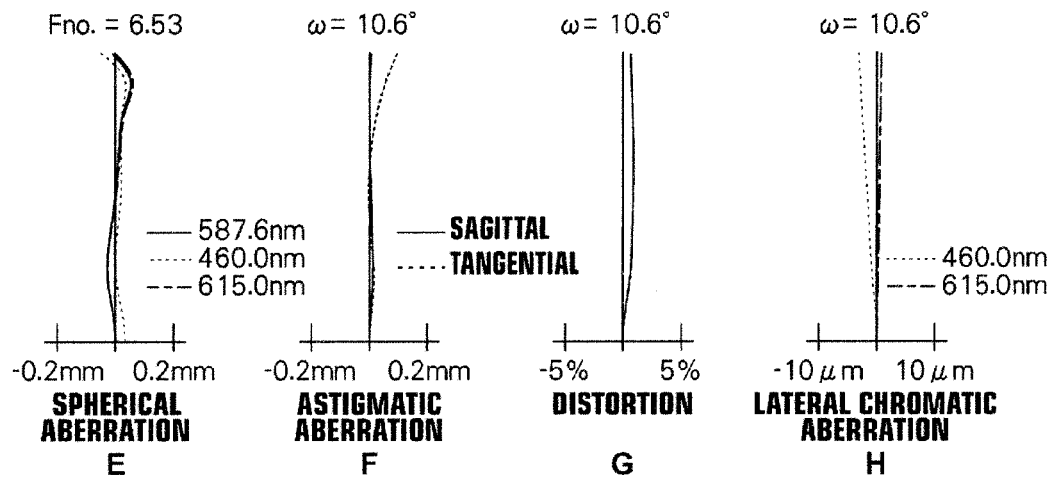

FIG.11
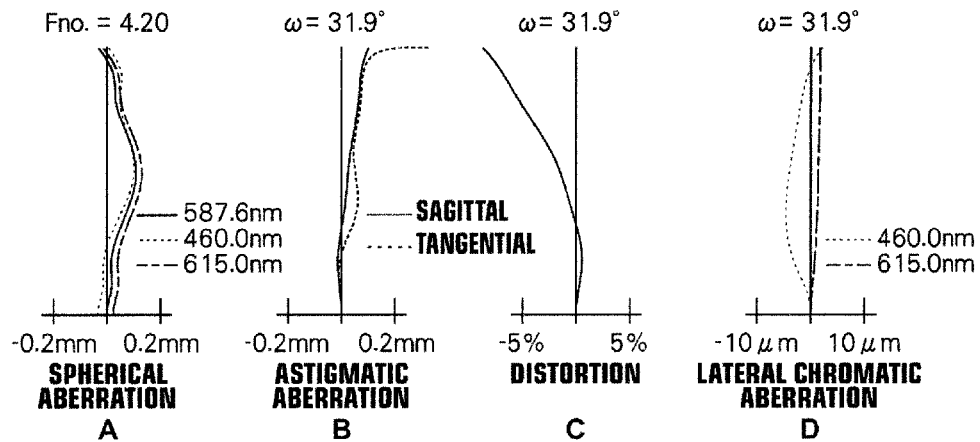
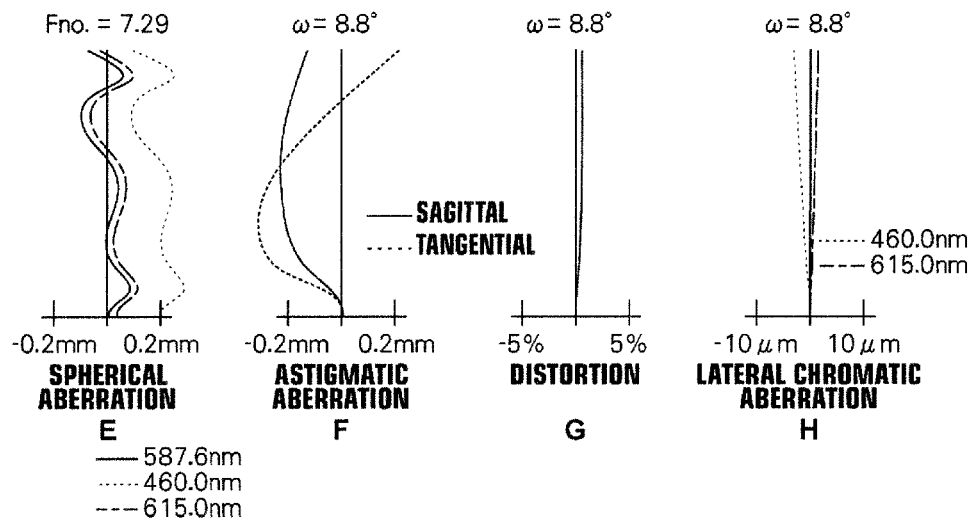

FIG.12
EXAMPLE 4
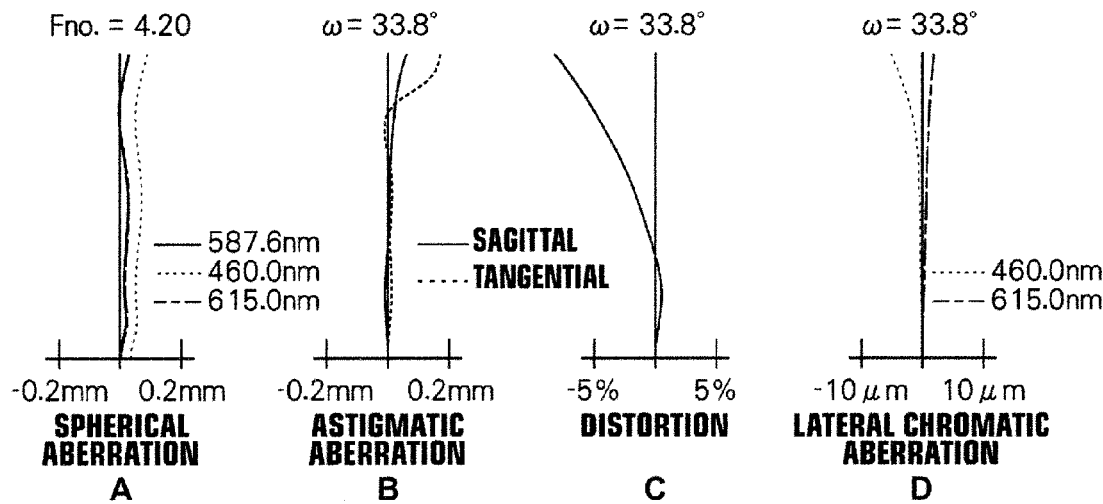
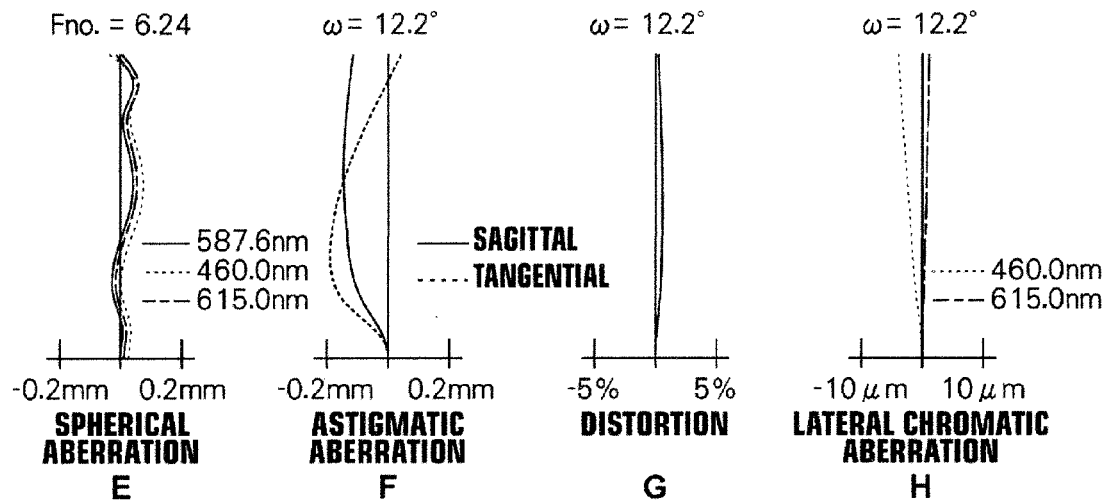

FIG.13
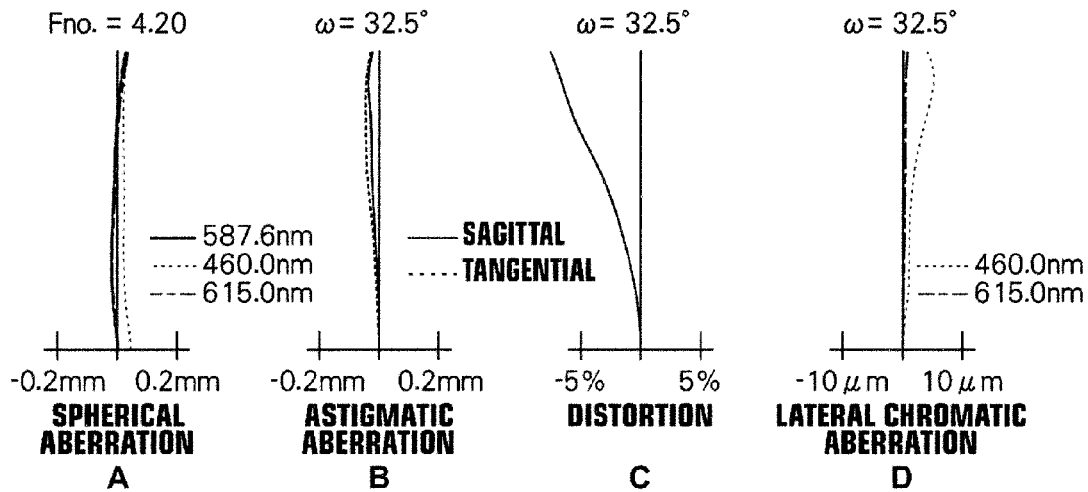
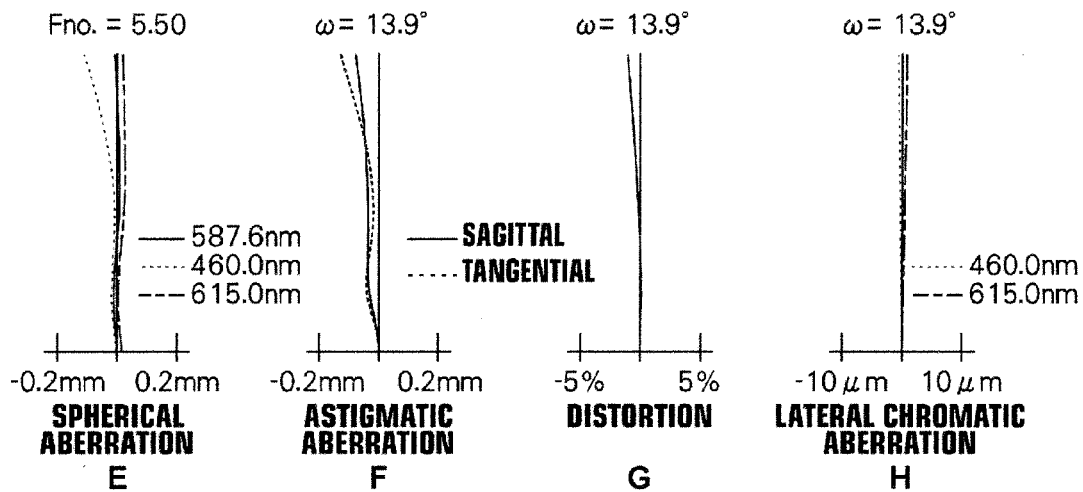

FIG.14
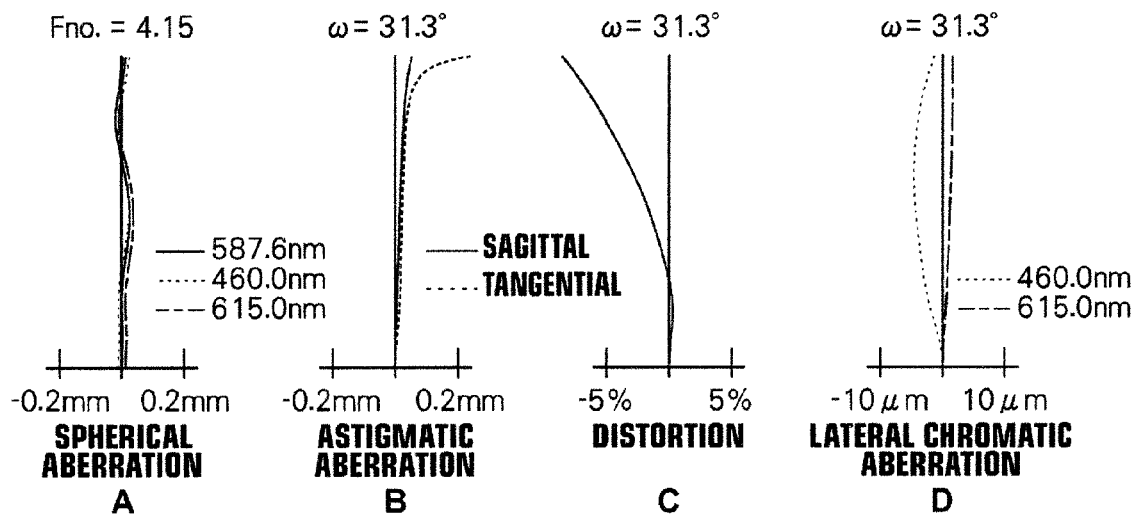
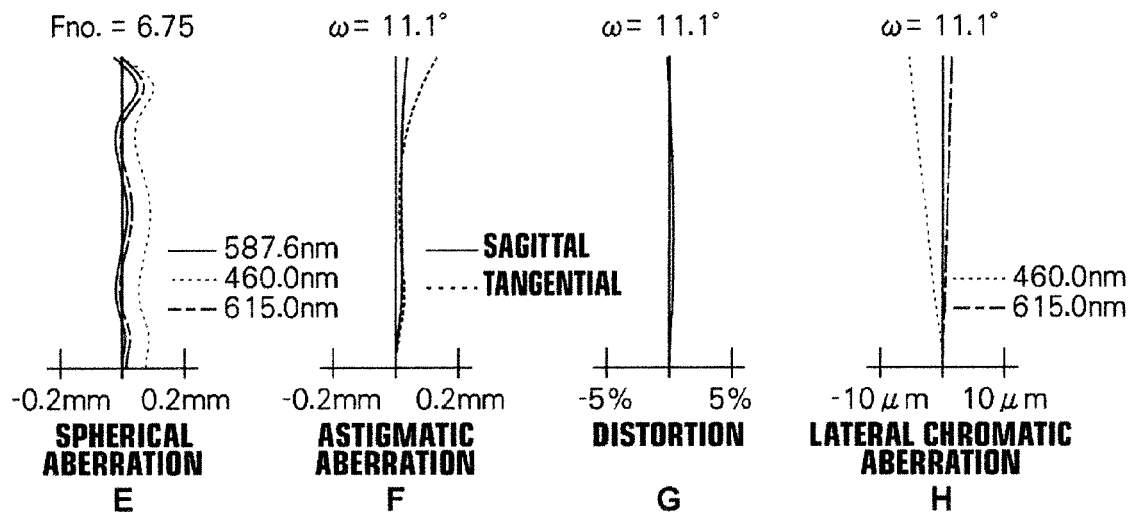

FIG.15
EXAMPLE 7
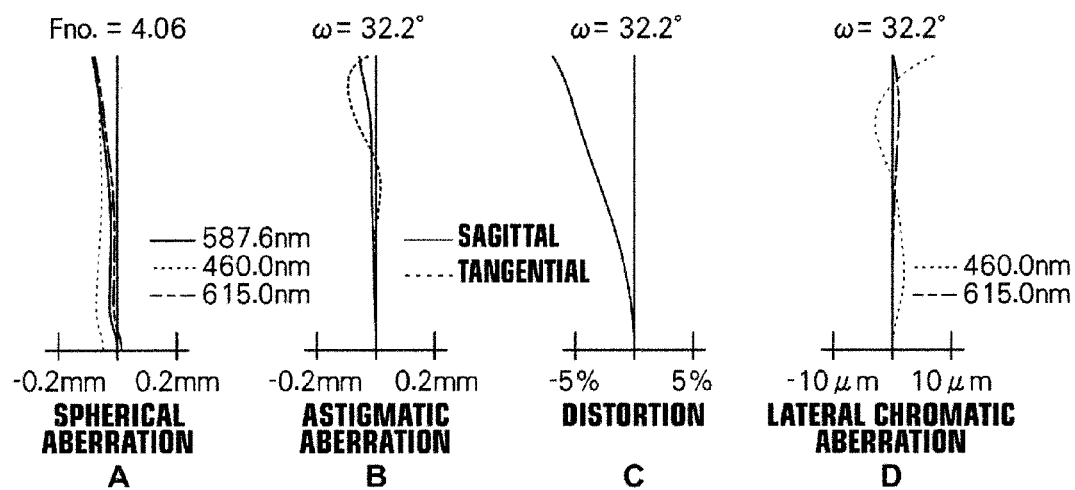
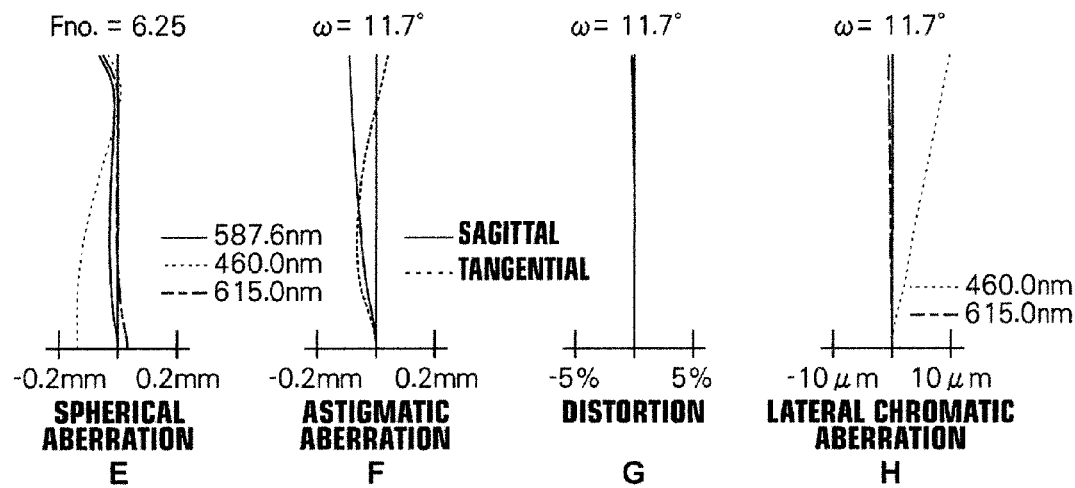

FIG.16
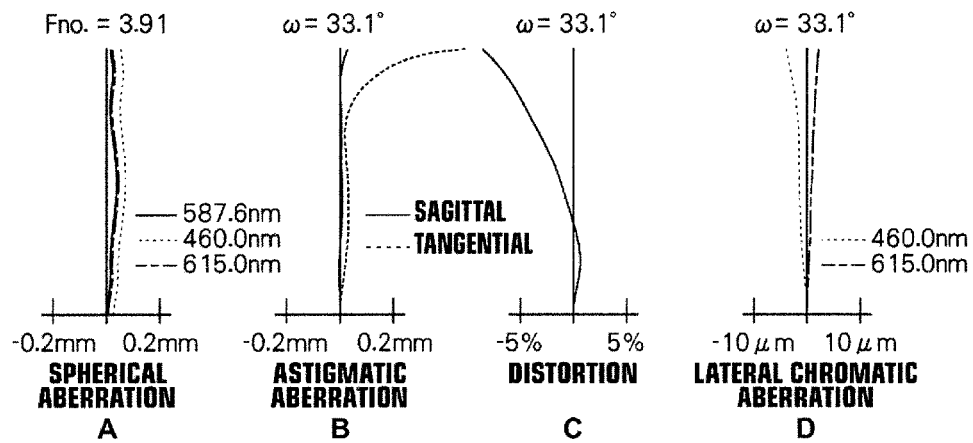
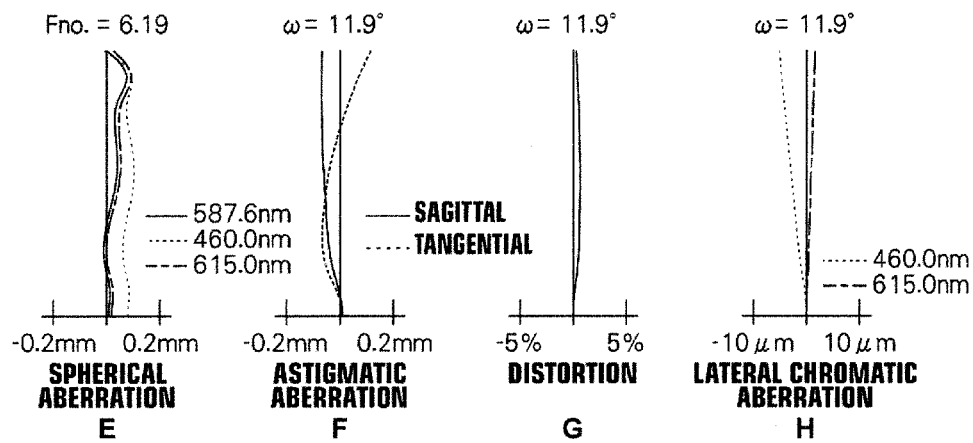

ZOOM LENS AND IMAGING APPARATUS

TECHNICAL FIELD

The present invention is related to a zoom lens and an imaging apparatus. Particularly, the present invention is related to a zoom lens which can be favorably utilized in miniature cameras and portable terminal devices, and to an imaging apparatus equipped with such a zoom lens.

BACKGROUND ART

Conventionally, zoom lenses of the two group or the three group type having leading negative lens groups (a configuration in which negative lens groups are provided toward the object side) are well known as zoom lenses to be provided in compact digital cameras, compact video cameras, and portable terminal devices. For example, Japanese Unexamined Patent Publication No. 2010-091948 discloses examples of a two group type zoom lens and a three group type zoom lens. As disclosed in Japanese Unexamined Patent Publication No. 2010-091948, aberrations can be corrected more advantageously by providing lenses toward the image side of the second lens group to adopt a three group configuration. In addition, this configuration increases the degree of freedom in design. Therefore, the advantageous effects of improved performance, miniaturization, and increased variable magnification ratio can be obtained.

Here, use of lower cost plastic lenses may be considered as a measure to reduce the cost of zoom lenses. There are many zoom lenses of the two group type and the three group type, which are employed in compact digital cameras and the like, that have a configuration in which the first lens group is constituted by a negative lens and a positive lens provided in this order from the object side. Between these two lenses, the positive lens is easier to form using a plastic material, from the viewpoint of molding properties.

Forming a positive lens of a first lens group using a plastic material has also been proposed (refer to Japanese Unexamined Patent Publication No. 2007-025373 and Japanese Unexamined Patent Publication No. 2007-187740, for example). More specifically, Japanese Unexamined Patent Publication No. 2007-025373 discloses that a positive lens of a first lens group is formed by a material having a refractive index of 1.58 and an Abbe's number of 30.9. In addition, Japanese Unexamined Patent Publication No. 2007-187740 discloses that a positive lens of a first lens group is formed by a material having a refractive index of 1.61 and an Abbe's number of 26.6. It is preferable for the difference between the Abbe's numbers of the positive lens of the first lens group and a negative lens of the first lens group to be great. Therefore, it is desirable for a material having a smaller Abbe's number to be employed for the positive lens.

Japanese Unexamined Patent Publication No. 2006-039182 and U.S. Patent Application Publication No. 20070171544 disclose that a material having an Abbe's number within a range from 23 to 24 is employed as the material of a positive lens, in order to increase the difference between the Abbe's numbers of the positive lens and a negative lens of the first lens group

DISCLOSURE OF THE INVENTION

The variable magnification ratios of the zoom lenses disclosed in Japanese Unexamined Patent Publication No. 2007-025373 and Japanese Unexamined Patent Publication No. 2007-187740 are approximately 2.4 and approximately 2.0, respectively. It can be said that such variable magnification ratios are too small to secure superiority as zoom lenses.

As described previously, the zoom lenses disclosed in Japanese Unexamined Patent Publication No. 2006-039182 and U.S. Patent Application Publication No. 20070171544 employ a material having an Abbe's number within a range from 23 to 24 for the positive lens of the first lens group. Meanwhile, the negative lenses of the first lens groups of the zoom lenses disclosed in Japanese Unexamined Patent Publication No. 2006-039182 and U.S. Patent Application Publication No. 20070171544 have refractive indices of 1.75 or greater and small Abbe's numbers. That is, it is considered that the zoom lenses disclosed in these documents are based on designs that prioritize miniaturization of lens systems over correction of chromatic aberrations.

From the viewpoint of correcting chromatic aberrations, it is preferable for a low refractive index/low dispersion material to be employed for a negative lens of a first lens group. In addition, taking the fact that use of a low refractive index material facilitates application of plastic, etc., which are low cost materials, it can be said that there is room for improvements with regard to cost reduction in the zoom lenses disclosed in Japanese Unexamined Patent Publication No. 2006-039182 and U.S. Patent Application Publication No. 20070171544 that employ high refractive index materials for the negative lenses thereof.

The present invention has been developed in view of the foregoing circumstances. It is an object of the present invention to provide a two lens group zoom lens that can secure a variable magnification ratio of approximately 3× with a small number of lenses, that can achieve cost reduction by employing plastic lenses, and that can realize favorable optical performance.

A first lens of the present invention comprises:

a first lens group having a negative refractive power; and a second lens group having a positive refractive power, provided in this order from an object side;

the distance between the first lens group and the second lens group changing when changing magnification;

the first lens group comprising a first lens having a negative refractive power and a second lens, which is plastic, having a positive refractive power; and the zoom lens satisfying the following conditional formulae:

$$1.48 < Nd1n < 1.71 \tag{1}$$

$$1.60 < Nd1p < 1.65 \tag{2}$$

$$18 < vd1p < 25 \tag{3}$$

$$0.2 < d2/fw < 0.5 \tag{4}$$

wherein Nd1n is the refractive index of the first lens with respect to the d line, Nd1p and vd1p are the refractive index and the Abbe's number of the second lens with respect to the d line, respectively, d2 is the spatial distance between the first lens and the second lens along an optical axis, and fw is the focal length of the entire system at the wide angle end.

Note that the "second lens group" of the zoom lens of the present invention is not necessarily constituted by a plurality of lenses, and may be a lens group constituted by a single lens. Cemented lenses may be employed as the lenses that constitute the second lens group. In the case that cemented lenses are employed, they will be counted as n lenses if they are constituted by n lenses cemented together. Further, the zoom lens of the present invention may further comprise other lens groups in addition to the first lens group and the second lens group.

In addition, the expressions "zoom lens of the present invention" and "zoom lens according to the present invention" in the present specification refer to both the first zoom lens of the present invention and the second zoom lens of the present invention to be described later, unless particularly noted.

The surface shapes and the signs of refractive powers of the lenses of the zoom lens of the present invention will be those in the paraxial regions for lenses that include aspherical surfaces.

A second zoom lens of the present invention comprises:
a first lens group having a negative refractive power; and
a second lens group having a positive refractive power, provided in this order from an object side;
the distance between the first lens group and the second lens group changing when changing magnification;
the first lens group comprising a negative lens most toward the object side and a plastic positive lens; and
the zoom lens satisfying the following conditional formulae:

$$1.621 < Nd1p < 1.650 \quad (2')$$

$$18 < vd1p < 24 \quad (3')$$

$$50 < Y \cdot TL < 550 \quad (5)$$

wherein Nd1p and vd1p are the refractive index and the Abbe's number of the second lens with respect to the d line, respectively, Y is a maximum image height, and TL is the distance along an optical axis from the surface of the lens most toward the object side in the first lens group to an imaging surface when the first lens group is positioned most toward the object side.

The first lens group of the second zoom lens of the present invention may further comprise other lenses in addition to the negative lens and the positive lens. In addition, Cemented lenses may be employed as the lenses that constitute the first lens group. In the case that cemented lenses are employed, they will be counted as n lenses if they are constituted by n lenses cemented together.

It is desirable for the second zoom lens according to the present invention to satisfy the conditional formula:

$$1.48 < Nd1n < 1.71 \quad (1)$$

wherein Nd1n is the refractive index of the negative lens of the first lens group most toward the object side with respect to the d line.

In the second zoom lens according to the present invention, it is desirable for the first lens group to be constituted by only two lenses, a first lens having a negative refractive power and a second lens having a positive refractive power, provided in this order from the object side.

In the case that the second zoom lens is configured in this manner, it is desirable for the second zoom lens to satisfy the conditional formula:

$$0.2 < d2/fw < 0.5 \quad (4)$$

wherein f2 is the spatial distance along the optical axis between the first lens and the second lens, and fw is the focal length of the entire system at the wide angle end.

In the zoom lens of the present invention, it is desirable for the second lens group to comprise at least one negative lens, and for the zoom lens to satisfy the following conditional formulae:

$$1.60 < Nd2n < 1.70 \quad (6)$$

$$20.0 < vd2n < 28.0 \quad (7)$$

wherein Nd2n and vd2n are the refractive index and the Abbe's number of the negative lens with respect to the d line, respectively.

In addition, in the zoom lens of the present invention, it is desirable for the second lens group to comprise only one negative lens, and for the negative lens to be a plastic lens.

In addition, it is desirable for the zoom lens of the present invention to satisfy the following conditional formula:

$$0.5 < (Rpr+Rpf)/(Rpr-Rpf) < 6.2 \quad (8)$$

wherein Rpf is the paraxial radius of curvature of the surface of the plastic lens having the positive refractive power provided in the first lens group toward the object side, and Rpr is the paraxial radius of curvature of the surface of the plastic lens having the positive refractive power provided in the first lens group toward the image side.

Note that the aforementioned paraxial radii of curvatures are the radii of curvature in the case that the surfaces of the lens approximate spherical surfaces.

In the zoom lens of the present invention, the second lens group may be constituted by two positive lenses and one negative lens.

Further, it is desirable for the zoom lens of the present invention to practically only comprise the first lens group and the second lens group as lens groups. Here, the expression "practically only comprise the first lens group and the second lens group as lens groups" means that the zoom lens may also include lenses that practically have any power, optical elements other than lenses such as aperture stops and cover glass, and mechanical components such as lens flanges, a lens barrel, an imaging element, a blur correcting mechanism, etc.

It is preferable for the zoom lens of the present invention to satisfy the following conditional formula:

$$48 < vd1n < 65 \quad (9)$$

wherein vd1n is the Abbe's number of the negative lens of the first lens group which is provided most toward the object side.

In addition, it is desirable for the zoom lens of the present invention to satisfy the following conditional formula:

$$0.45 < M2/ft < 0.75 \quad (10)$$

wherein M2 is the amount of movement of the second lens group when changing magnification from the wide angle end to the telephoto end, and ft is the focal length of the entire system at the telephoto end.

In addition, it is desirable for the zoom lens of the present invention to satisfy the following conditional formula:

$$0.22 < d12t/d2gt < 0.60 \quad (11)$$

wherein d12t is the spatial distance along the optical axis from the surface of a lens of the first lens group most toward the image side to the surface of a lens of the second lens group most toward the object side when the zoom lens is focused on an object at infinity at the telephoto end, and d2gt is the distance along the optical axis from the surface of a lens of the second lens group most toward the object side to the surface of the lens of the second lens group most toward the image side.

In addition, it is desirable for the zoom lens of the present invention to satisfy the following conditional formula:

$$5.8 < TLw/fw < 8.4 \quad (12)$$

wherein TLw is the distance from the surface of the first lens most toward the object side to an imaging surface along the optical axis at the wide angle end, and fw is the focal length of the entire system at the wide angle end.

Further, it is desirable for a positive lens to be provided most toward the object side in the second lens group, and for the zoom lens of the present invention to satisfy the following conditional formulae:

$$1.48 < Nd2p < 1.65 \quad (13)$$

$$45 < vd2p < 65 \quad (14)$$

wherein Nd2p and vd2p are the refractive index and the Abbe's number of the positive lens with respect to the d line, respectively.

In the zoom lens of the present invention, it is preferable for the negative lens provided most toward the object side in the first lens group to be an aspherical lens, and further for the negative lens to be a plastic lens in order to reduce cost. In addition, it is preferable for the plastic lens having the positive refractive power provided in the first lens group to be an aspherical lens.

In the zoom lens of the present invention, it is preferable for the lens provided cost toward the object side in the second lens group to be an aspherical lens, and further for this lens to be a plastic lens in order to reduce cost. In addition, it is preferable for the plastic lens having the positive refractive power provided in the first lens group to be an aspherical lens. In addition, it is preferable for the lens provided most toward the image side in the second lens group to be an aspherical lens, and further for this lens to be a plastic lens in order to reduce cost.

In the zoom lens of the present invention, it is preferable for all of the lens systems to be constituted by five or fewer lenses. The second lens group may be constituted by one positive lens and one negative lens. Further, all of the lenses of the lens systems may be plastic lenses.

In the zoom lens of the present invention, it is preferable for a configuration to be adopted, wherein the entirety of the second lens group or a portion of the lenses of the second lens group is moved along the optical axis when focusing from infinity to a near distance. More specifically, when the second lens group is constituted by the third lens having a positive refractive power, the fourth lens having a negative refractive power, and the fifth lens having a positive refractive power, in this order from the object side, it is preferable for only the fifth lens to be moved along the optical axis.

In the zoom lens of the present invention, more preferable ranges for the conditions expressed by conditional, formulae (1), (3), (5), (6), (8), and (9) are as follows:

$$1.48 < Nd1n < 1.70 \quad (1')$$

$$19 < vd1p < 24 \quad (3'')$$

$$55 < Y \cdot TL < 530 \quad (5')$$

$$1.60 < Nd2n < 1.69 \quad (6')$$

$$1.6 < (Rpr + Rpf)/(Rpr - Rpf) < 6.1 \quad (8')$$

$$50 < vd1n < 65 \quad (9')$$

Note that Conditional Formula (3") is more preferable than previously listed Conditional Formula (3').

Meanwhile, the imaging apparatus of the present invention is characterized by being equipped with the first or the second zoom lens of the present invention described above.

The first zoom lens according to the present invention comprises: the first lens group having a negative refractive power; and the second lens group having a positive refractive power, provided in this order from an object side; the distance between the first lens group and the second lens group changing when changing magnification; and the zoom lens satisfying the aforementioned conditional formulae (1) through (4) when Nd1n is the refractive index of the first lens with respect to the d line, Nd1p and vd1p are the refractive index and the Abbe's number of the second lens with respect to the d line, respectively, d2 is the spatial distance between the first lens and the second lens along an optical axis, and fw is the focal length of the entire system at the wide angle end. Therefore, a variable magnification ratio of approximately 3× can be secured with a small number of lenses, while achieving cost reduction by the use of plastic lenses and realizing favorable optical performance.

Hereinafter, the aforementioned advantageous effects will be described in greater detail. Conditional Formula (1) determines the refractive index of the negative lens (the first lens) provided most toward the object side in the first lens group. In the case that the positive lens (the second lens) provided in the first lens group is constituted by a plastic material having the optical properties indicated by Conditional Formula (2) and Conditional Formula (3) and the value of Nd1n is greater than or equal to the upper limit defined in Conditional Formula (1), the power of the negative lens provided most toward the object side in the first lens group and the power of the positive lens in the first lens group will become great. As a result, correction of spherical aberrations and coma aberrations becomes difficult, which is not preferable. Inversely, if the value of Nd1n is less than or equal to the lower limit defined in Conditional Formula (1), it becomes difficult to correct lateral chromatic aberration and astigmatic aberration in a balanced manner, which is not preferable. The above shortcomings can be prevented in the case that Conditional Formula (1) is satisfied. Further, an advantageous effect that application of comparatively inexpensive lens materials such as plastic is facilitated is obtained by satisfying Conditional Formula (1).

The above advantageous effects will become more prominent particularly in the case that Conditional Formula (1') is satisfied within the range defined in Conditional Formula (1).

Conditional Formula (2) determines the refractive index of the positive lens formed by plastic provided in the first lens group. If the value of Nd1p is less than or equal to the lower limit defined in Conditional Formula (2), the radius of curvature (approximated radius of curvature) of the second lens will become great. As a result, the occurrence of various types of aberrations and lateral chromatic aberration will increase, which is not preferable. Inversely, if the value of Nd1p is greater than or equal to the upper limit defined in Conditional Formula (2), astigmatic aberration becomes great, which is not preferable. In addition, it becomes difficult to select a plastic material having favorable optical proper ties. The above shortcomings can be prevented in the case that Conditional Formula (2) is satisfied.

Conditional Formula (3) determines the Abbe's number of the positive lens formed by plastic provided in the first lens group. If the value of vd1p is less than or equal to the lower limit defined in Conditional Formula (3), it becomes difficult to correct longitudinal chromatic aberration and lateral chromatic aberration in a balanced manner, which is not preferable. Inversely, if the value of vd1p is greater than or equal to the upper limit defined in Conditional Formula (3), the difference in Abbe's numbers between the positive lens and the negative lens provided in the first lens group decreases, and it will become necessary to increase the power of the lenses in order to correct chromatic aberrations. As a result, correction of spherical aberration and astigmatic aberration will become difficult, which is not preferable. The above shortcomings can be prevented in the case that Conditional Formula (3) is satisfied.

The above advantageous effects will become more prominent particularly in the case that Conditional Formula (3″) is satisfied within the range defined in Conditional Formula (3).

Conditional Formula (4) determines the relationship between the spatial distance between the negative lens and the positive lens of the first lens group and the focal length of the entire system at the wide angle end. If the value of d2/fw is less than or equal to the lower limit defined in Conditional Formula (4), such a small distance is advantageous from the viewpoint of miniaturization, but is not preferable because correction of spherical aberration will become difficult. Inversely, if the value of d2/fw is greater than or equal to the upper limit defined in Conditional formula (4), the first lens group will become large as a whole, which is not preferable. The above shortcomings can be prevented in the case that Conditional Formula (4) is satisfied.

Meanwhile, the second zoom lens according to the present invention comprises: the first lens group having a negative refractive power; and the second lens group having a positive refractive power, provided in this order from an object side; the distance between the first lens group and the second lens group changing when changing magnification; the first lens group comprising a negative lens most toward the object side and a plastic positive lens; and the zoom lens satisfying Conditional Formulae (2'), (3'), and (5) when Nd1p and vd1p are the refractive index and the Abbe's number of the second lens with respect to the d line, respectively, Y is a maximum image height, and TL is the distance along an optical axis when the first lens group is positioned most toward the object side. Therefore, a variable magnification ratio of approximately 3× can be secured with a small number of lenses, while achieving cost reduction by the use of plastic lenses, and realizing favorable optical performance.

Hereinafter, the aforementioned advantageous effects will be described in greater detail. The advantageous effects obtained by satisfying Conditional Formulae (2') and (3') are basically the same as those obtained by satisfying Conditional Formula (2) and (3), but are more prominent. In addition, the advantageous effects obtained by satisfying Conditional Formula (3') will become more prominent in the case that Conditional Formula (3″) is satisfied within the range defined in Conditional Formula (3').

Conditional Formula (5) determines the product of the maximum image height and the total length of the optical system. If the value of Y·TL is greater than or equal to the upper limit defined in Conditional Formula (5), the size of a compact camera will increase, which is not preferable from the viewpoint of portability. Inversely, if the value of Y·TL is less than or equal to the lower limit defined in Conditional Formula (5), the zoom lens will become extremely compact, but the number of pixels of imaging elements that can be applied will decrease. Alternatively, if the number of pixels is maintained the same, the pixel size is decreased. In either case, image quality will deteriorate, which is not preferable. The above shortcomings can be prevented in the case that Conditional Formula (5) is satisfied.

The above advantageous effects will become more prominent particularly in the case that Conditional Formula (5') is satisfied within the range defined in Conditional Formula (5).

Note that particularly in the case that the second zoom lens according to the present invention satisfies Conditional Formula (1), the aforementioned advantageous effects obtained by satisfying Conditional Formula (1) can be similarly obtained. In addition, particularly in the case that the first lens group of the second zoom lens according to the present invention is constituted only by the first lens having the negative refractive power and the second lens having the positive refractive power, provided in this order from the object size, the number of lenses can be suppressed, and further cost reductions can be realized.

Further, particularly in the case that the second zoom lens is configured in this manner and Conditional Formula (4) is satisfied, the advantageous effects which are obtained by satisfying Conditional Formula (4) that were described previously can be similarly obtained.

Meanwhile, particularly in the case that the zoom lens of the present invention satisfies Conditional Formulae (6) and (7), the following advantageous effects can be obtained. That is, Conditional Formula (6) determines the refractive index of the negative lens provided in the second lens group. If the value of Nd2n is outside the range defined in Conditional Formula (6), it will become difficult to correct spherical aberrations and astigmatic aberrations in a balanced manner, which is not preferable. The above shortcomings can be prevented in the case that Conditional Formula (6) is satisfied.

The above advantageous effects will become more prominent particularly in the case that Conditional Formula (6') is satisfied within the range defined in Conditional Formula (6).

Conditional Formula (7) determines the Abbe's number of the negative lens provided in the second lens group. If the value of vd2n is outside the range defined in Conditional Formula (7), it will become difficult to correct longitudinal chromatic aberrations and lateral chromatic aberrations in a balanced manner within all zoom regions. The above shortcomings can be prevented in the case that Conditional Formula (7) is satisfied.

In the zoom lens of the present invention, further cost reductions can be realized particularly in the case that the second lens group comprises only one negative lens, and the negative lens is a plastic lens.

In the zoom lens of the present invention, the following advantageous effects can be obtained, particularly in the case that Conditional Formula (8) is satisfied. That is, Conditional Formula (8) determines the shape factor of the plastic lens having the positive refractive power provided in the first lens group. If the value of (Rpr+Rpf)/(Rpr−Rpf) is less than or equal to the lower limit defined in Conditional Formula (8), the powers of the negative lens and the positive lens provided in the first lens group will become great. As a result, it will become difficult to correct spherical aberrations and coma aberrations in a balanced manner. Inversely, if the value of (Rpr+Rpf)/(Rpr−Rpf) is greater than or equal to the upper limit defined in Conditional Formula (8), the powers of the negative lens and the positive lens provided in the first lens group will become excessively weak, and it will become difficult to correct longitudinal chromatic aberrations and lateral chromatic aberrations in a balanced manner. The above shortcomings can be prevented in the case that Conditional Formula (8) is satisfied.

The above advantageous effects will be more prominent particularly in the case that Conditional Formula (8') is satisfied within the range defined in Conditional Formula (8).

In addition, in the zoom lens of the present invention, the advantageous effects related to cost reduction will become more prominent particularly in the case that the second lens group is constituted by two positive lenses and one negative lens.

Further, the advantageous effects related to cost reduction will also become more prominent in the case that the zoom lens of the present invention practically comprises only the first lens group and the second lens group.

In the zoom lens of the present invention, the following advantageous effects can be obtained particularly in the case that Conditional Formula (9) is satisfied. That is, if the value of vd1n is outside the range defined in Conditional Formula (9), it will become difficult to correct longitudinal chromatic aberrations and lateral chromatic aberrations in a balanced manner within all zoom regions, which is not preferable. The above shortcomings can be prevented in the case that Conditional Formula (9) is satisfied.

The above advantageous effects will be more prominent in the case that Conditional Formula (9') is satisfied within the range defined in Conditional Formula (9).

In the zoom lens of the present invention, the following advantageous effects can be obtained particularly in the case that Conditional Formula (10) is satisfied. That is, if the value of M2/ft is less that or equal to the lower limit defined in Conditional Formula (10), it will become difficult to increase the variable magnification ratio. In addition, it will become necessary to increase the power of the second lens group, resulting in the tolerances for production error and assembly error becoming small, which is not preferable. Inversely, if the value of M2/ft is greater than or equal to the upper limit defined in Conditional Formula (10), the amount of movement of the second lens group will become great, and the lens system will become large, which is not preferable. The above shortcomings can be prevented in the case that Conditional Formula (10) is satisfied.

In the zoom lens of the present invention, the following advantageous effects can be obtained particularly in the case that Conditional Formula (11) is satisfied. That is, if the value of d12t/d2gt is less that or equal to the lower limit defined in Conditional Formula (11), it will become difficult to avoid interference among the lenses that constitute the first lens group and the second lens group, lens holding members, and the like, which is not preferable. Inversely, if the value of d12t/d2gt is greater than or equal to the upper limit defined in Conditional Formula (11), it will become difficult to obtain a desired variable magnification ratio while suppressing the total length of the optical system, which is not preferable. The above shortcomings can be prevented in the case that Conditional Formula (11) is satisfied.

In addition, the following advantageous effects can be obtained particularly in the case that the zoom lens of the present invention satisfies Conditional Formula (12). That is, if the value of TLw/fw is less than or equal to the lower limit defined in Conditional Formula (12), the zoom lens can be configured to be compact. However, the power of each lens will become great, resulting in correction of aberrations becoming difficult. In addition, the tolerances for production error and assembly error will become small, which is not preferable. If the value of TLw/fw is greater than or equal to the upper limit defined in Conditional. Formula (12), the total length of the optical system will become great, which is not preferable. The above shortcomings can be prevented in the case that Conditional Formula (12) is satisfied.

In addition, the following advantageous effects can be obtained in the case that the zoom lens of the present invention satisfies Conditional Formulae (13) and (14). That is, if the value of Nd2p is less than or equal to the lower limit defined in Conditional Formula (13), the radius of curvature (approximated radius of curvature) of the second lens will become great. As a result, the central thickness will become great in order to secure a necessary flange (edge thickness), the second lens group will become large, and the occurrence of various aberrations will increase, which is not preferable. Inversely, if the value of Nd2p is greater than or equal to the upper limit defined in Conditional Formula (13), it will become difficult to correct spherical aberrations in a balanced manner, which is not preferable. Meanwhile, if the value of value of vd2p is outside the range defined in Conditional Formula (14), it will become difficult to correct longitudinal chromatic aberrations and lateral chromatic aberrations in a balanced manner within all zoom regions, which is not preferable. The above shortcomings can be prevented in the case that Conditional Formulae (13) and (14) are satisfied.

In the zoom lens of the present invention, the advantageous effects related to cost reduction will become more prominent, particularly in the case that the entire lens system is constituted by five lenses or less, the second lens group is constituted by one positive lens and one negative lens, or all of the lenses of the lens system are plastic lenses.

In the zoom lens of the present invention, the following advantageous effects can be obtained in the case that a configuration is adopted, wherein the entirety of the second lens group or a portion of the lenses of the second lens group is moved along the optical axis when focusing from infinity to a near distance, or more specifically, in the case that a configuration is adopted, in which the second lens group comprises the third lens having a positive refractive power, the fourth lens having a negative refractive power, and the fifth lens having a positive refractive power, and only the fifth lens is moved along the optical axis. That is, in the zoom type lens employed in the present invention, it is possible to obtain favorable optical performance regardless of whether the entirety of the first lens group, the entirety of the second lens group, or a portion of the lenses of the second lens group, is selected as the lenses to be moved during focusing operations. However, in the case that a configuration in which the entirety of the first lens group is moved forward to focus, the effective diameter of the first lens group will become large and it will become necessary to move lenses having large outer diameters. However, such problems can be avoided in the case that a configuration is adopted, in which the entirety of the second lens group or a portion of the lenses of the second lens group are moved to perform focusing operations.

Meanwhile, the imaging apparatus according to the present invention is equipped with the zoom lens of the present invention that exhibits the advantageous effects described above. Therefore, the imaging apparatus of the present invention can achieve cost reduction while maintaining favorable optical performance.

BRIEF DESCRIPTION OF THE DRAWINGS

FIG. 1 is a cross sectional diagram that illustrates the lens configuration of a zoom lens according to a first embodiment of the present invention.

FIG. 2 is a cross sectional diagram that illustrates the lens configuration of a zoom lens according to a second embodiment of the present invention.

FIG. 3 is a cross sectional, diagram that illustrates the lens configuration of a zoom lens according to a third embodiment of the present invention.

FIG. 4 is a cross sectional diagram that illustrates the lens configuration of a zoom lens according to a fourth embodiment of the present invention.

FIG. 5 is a cross sectional diagram that illustrates the lens configuration of a zoom lens according to a fifth embodiment of the present invention.

FIG. 6 is a cross sectional diagram that illustrates the lens configuration of a zoom lens according to a sixth embodiment of the present invention.

FIG. 7 is a cross sectional diagram that illustrates the lens configuration of a zoom lens according to a seventh embodiment of the present invention.

FIG. 8 is a cross sectional diagram that illustrates the lens configuration of a zoom lens according to an eighth embodiment of the present invention.

FIG. 9 A through H are graphs that illustrate various aberrations of the zoom lens of the first embodiment.

FIG. 10 A through H are graphs that illustrate various aberrations of the zoom lens of the second embodiment.

FIG. 11 A through H are graphs that illustrate various aberrations of the zoom lens of the third embodiment.

FIG. 12 A through H are graphs that illustrate various aberrations of the zoom lens of the fourth embodiment.

FIG. 13 A through H are graphs that illustrate various aberrations of the zoom lens of the fifth embodiment.

FIG. 14 A through H are graphs that illustrate various aberrations of the zoom lens of the sixth embodiment.

FIG. 15 A through H are graphs that illustrate various aberrations of the zoom lens of the seventh embodiment.

FIG. 16 A through H are graphs that illustrate various aberrations of the zoom lens of the eighth embodiment.

BEST MODE FOR CARRYING OUT THE INVENTION

Figure 17:
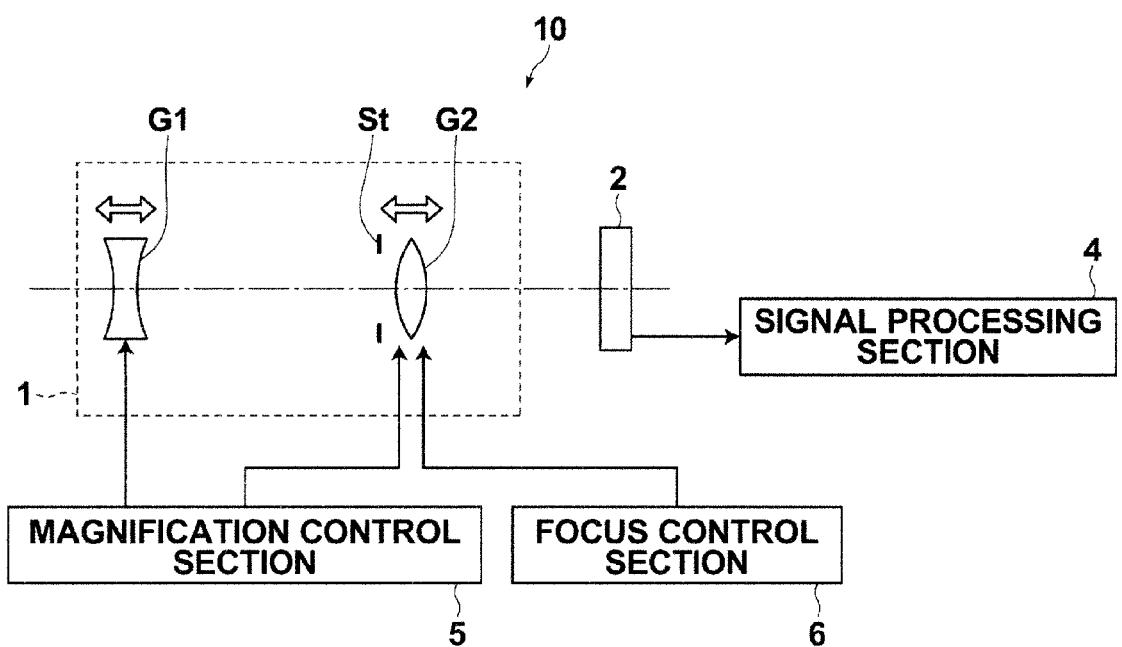
FIG. 17 is a diagram that schematically illustrates an imaging apparatus according to an embodiment of the present invention.

Hereinafter, embodiments of the present invention will be described in detail with reference to the attached drawings. FIG. 1 is a cross sectional diagram that illustrates the configuration of a zoom lens according to an embodiment of the present invention, and corresponds to a zoom lens of Example 1 to be described later. FIG. 2 through FIG. 8 are cross sectional diagrams that illustrate configurations of zoom lenses according to other embodiments of the present invention, and corresponds to zoom lenses of Examples 2 through 8 to be described later.

The basic configurations of the embodiments illustrated in FIG. 1 through FIG. 8 are the same except that a second lens group G2 is constituted by two lenses in the embodiment of FIG. 7, and that the embodiment of FIG. 8 includes a third lens group G3. The manners in which the configurations are illustrated are also the same. Therefore, the zoom lenses according to the embodiments of the present invention will be described mainly with reference to FIG. 1. In addition, the points in which the embodiments of FIGS. 7 and 8 differ from the other embodiments will be described in detail later.

In FIG. 1, the left side is the object side and the right side is the image side. A of FIG. 1 illustrates the arrangement of the optical system in a state focused on infinity at the wide angle end (shortest focal length state). B of FIG. 1 illustrates the arrangement of the optical system in a state focused on infinity at the telephoto end (longest focal length state). The same applies to FIGS. 2 through 8 to be described later.

Each of the zoom lenses according to the embodiments of the present invention has a first lens group G1 having a negative refractive power and a second lens group G2 having a positive refractive power, in this order from the object side. An aperture stop St is included in the second lens group G2. The aperture stop St illustrated in the drawings does not necessarily represent the size or shape thereof, but only the position thereof on an optical axis Z.

Note that FIG. 1 illustrates an example in which a parallel plate optical member PP is provided between the second lens group G2 and an imaging surface Sim. When the zoom lens is applied to an imaging apparatus, it is preferable for various filters, such as a cover glass, an infrared ray cutoff filter, and a low pass filter, to be provided between the optical system and the imaging surface Sim, according to the configuration of a camera on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In this case, a color separating optical system may be provided at the position of the optical member PP.

This zoom lens is configured such that the distance between the first lens group G1 and the second lens group G2 changes when changing magnification. More specifically, the first lens group G1 moves toward the imaging surface Sim along a convex trajectory, the second lens group G2 moves monotonously toward the object side when changing magnification from the wide angle end to the telephoto end, and the aperture stop St moves integrally with the second lens group G2. The movement trajectories of the first lens group G1 and the second lens group G2 when changing magnification from the wide angle end to the telephoto end are schematically illustrated by the arrows between A and B of FIG. 1.

The first lens group G1 is constituted by a first lens L11 having a negative refractive power and a second lens L12 having a positive refractive power, in this order from the object side. Here, the first lens L11 may be a biconcave lens and the second lens L12 may be a positive meniscus lens, as illustrated in the example illustrated in FIG. 1. In the zoom lens of the present invention, the latter of the first lens L11 and the second lens L12 is a plastic lens. In the present embodiment, both of the lenses are plastic lenses.

In the present zoom lens, the second lens group G2 is constituted by a third lens 21 having a positive refractive power, a fourth lens L22 having a negative refractive power, and a fifth lens L23 having a positive refractive power, in this order from the object side. The third lens L21 may be a biconvex lens, the fourth lens L22 may be a biconcave lens, and the fifth lens L23 may be a positive meniscus lens as in the example illustrated in FIG. 1. Note that in the configuration illustrated in FIG. 1, all of the lenses L21, L22, and L23 of the second lens group G2 are plastic lenses.

Here, the materials of the lenses in the embodiments illustrated in FIG. 2 through FIG. 8 will be described. All of the lenses are plastic lenses except for the third lens L21 of FIG. 3, the first lens L11, the third lens L21, and the fourth lens L22 of FIG. 4, and the lens L11 of FIG. 5.

As described above, the first lens group G1 is constituted by the first lens L11 and the second lens L12. At least the second lens L12 is a plastic lens (more preferably, both of the lenses are plastic lenses). In addition, the zoom lens satisfies Conditional Formulae (1) through (4) to be described later, and further Conditional Formulae (2'), (3'), and (5). Therefore, a variable magnification ratio of approximately 3× can be secured with a small number of lenses, while achieving cost reduction by the use of plastic lenses and realizing favorable optical performance.

Among the configurations illustrated in FIGS. 1 through 8, the configuration illustrated in FIG. 7 differs from the others in that the second lens group G2 is constituted by two lenses, that is, the third lens L21 and the fourth lens L22. However, the aforementioned operational advantageous effects can be obtained by this configuration as well.

In addition, the configuration illustrated in FIG. 8 differs from the others in that a third lens group G3 comprising one sixth lens L31 is provided in addition to the first lens group G1 and the second lens group G2. However, the aforementioned operational advantageous effects can be obtained by this configuration as well. The sixth lens L31 that constitutes the third lens group G3 may be a biconvex lens as illustrated in FIG. 8.

Next, the configurations of the present zoom lens related to conditional formulae will be described. The present zoom lens satisfies the following conditional formulae:

$$1.48 < Nd1n < 1.71 \quad (1)$$

$$1.60 < Nd1p < 1.65 \quad (2)$$

$$18 < vd1p < 25 \quad (3)$$

$$0.2 < d2/fw < 0.5 \quad (4)$$

wherein Nd1n is the refractive index of the first lens L11 with respect to the d line, Nd1p and vd1p are the refractive index and the Abbe's number of the second lens L12 with respect to the d line, respectively, d2 is the spatial distance between the first lens L11 and the second lens L12 along the optical axis, and fw is the focal length of the entire system at the wide angle end.

Note that examples of numerical values of each condition determined by the above Conditional Formulae (1) through (4) for each embodiment are shown in Table 25. In addition, Table 25 also shows examples of numerical values of each condition determined by Conditional Formula (5) to be described later.

The present zoom lens also satisfies the following conditional formulae:

$$1.621 < Nd1p < 1.650 \quad (2')$$

$$18 < vd1p < 24 \quad (3')$$

$$50 < Y \cdot TL < 550 \quad (5)$$

wherein Nd1p and vd1p are the refractive index and the Abbe's number of the positive lens (the second lens L12) of the first lens group G1 with respect to the d line, respectively, Y is a maximum image height, and TL is the distance along the optical axis from the surface of the lens most toward the object side (the surface of the first lens L11 toward the object side) in the first lens group G1 to an imaging surface when the first lens group G1 is positioned most toward the object side % refer to Table 25, the same applies hereinafter).

In addition, the present zoom lens satisfies the following conditional formulae:

$$1.60 < Nd2n < 1.70 \quad (6)$$

$$20.0 < vd2n < 28.0 \quad (7)$$

wherein Nd2n and vd2n are the refractive index and the Abbe's number of the negative lens (the fourth lens L22) of the second lens group G2 with respect to the d line, respectively.

In addition, the zoom lens of the present example satisfies the following conditional formula:

$$0.5 < (Rpr+Rpf)/(Rpr-Rpf) < 6.2 \quad (8)$$

wherein Rpf is the paraxial radius of curvature of the surface of the plastic lens (the second lens L12) having the positive refractive power provided in the first lens group G1 toward the object side, and Rpr is the paraxial radius of curvature of the surface of the plastic lens (the second lens L12) having the positive refractive power provided in the first lens group G1 toward the image side. Note that the aforementioned paraxial radii of curvatures are the radii of curvature in the case that the surfaces of the lens approximate spherical surfaces.

The present zoom lens satisfies the following conditional formula:

$$48 < vd1n < 65 \quad (9)$$

wherein vd1n is the Abbe's number of the negative lens (the first lens L11) of the first lens group G1 which is provided most toward the object side.

Further, the present zoom lens satisfies the following conditional formula:

$$0.45 < M2/ft < 0.75 \quad (10)$$

wherein M2 is the a-mount of movement of the second lens group G2 when changing magnification from the wide angle end to the telephoto end, and ft is the focal length of the entire system at the telephoto end.

In addition, the present zoom lens satisfies the following conditional formula:

$$0.22 < d12t/d2gt < 0.60 \quad (11)$$

wherein d12t is the spatial distance along the optical axis from the surface of a lens of the first lens group G1 most toward the image side (the surface of the second lens L12 toward the image side) to the surface of a lens of the second lens group G2 most toward the object side (the surface of the third lens 21 toward the object side) when the zoom lens is focused on an object at infinity at the telephoto end, and d2gt is the distance along the optical axis from the surface of a lens of the second lens group G2 most toward the object side to the surface of the lens of the second lens group G2 most toward the image side (the surface of the fifth lens L23 toward the image side).

In addition, the present zoom lens satisfies the following conditional formula:

$$5.8 < TLw/fw < 8.4 \quad (12)$$

wherein TLw is the distance from the surface of a lens most toward the object side in the first lens group G1 (the surface of the first lens L11 toward the object side) to an imaging surface Sim along the optical axis at the wide angle end, and fw is the focal length of the entire system at the wide angle end.

Further, the present zoom lens is provided with a positive lens (the third lens L21) most toward the object side in the second lens group G2, and satisfies the following conditional formulae:

$$1.48 < Nd2p < 1.65 \quad (13)$$

$$45 < vd2p < 65 \quad (14)$$

wherein Nd2p and vd2p are the refractive index and the Abbe's number of the third lens L21 with respect to the d line, respectively.

In the present zoom lens, the negative lens (the first lens L11) provided most toward the object side in the first lens group G1 is an aspherical lens, and further, the first lens L1 is a plastic lens in order to reduce cost. In addition, the plastic lens (the second lens L12) having the positive refractive power provided in the first lens group G1 is also an aspherical lens.

In the present zoom lens, the lens (the third lens L21) provided most toward the object side in the second lens group G2 is an aspherical lens, and further the third lens L21 is a plastic lens in order to reduce cost. In addition, the lens (the fifth lens L23) provided most toward the image side in the second lens group G2 is an aspherical plastic lens in order to reduce cost.

The present zoom lens is of a configuration, in which the entirety of the second lens group G2 is moved along the optical axis when focusing from infinity to a near distance. However, the present invention is not limited, to this configuration, and only a portion of the lenses provided in the second lens group G2, for example, the fifth lens L23 having the positive refractive power, may be moved along the optical axis.

Note that as described previously, in the zoom lens of the present invention, more preferable ranges for the conditions expressed by conditional formulae (1), (3), (5), (6), (8), and (9) are as follows:

$$1.48 < Nd1n < 1.70 \tag{1'}$$

$$19 < vd1p < 24 \tag{3''}$$

$$55 < Y \cdot TL < 530 \tag{5'}$$

$$1.60 < Nd2n < 1.69 \tag{6'}$$

$$1.6 < (Rpr+Rpf)/(Rpr-Rpf) < 6.1 \tag{8'}$$

$$50 < vd1n < 65 \tag{9'}$$

The present zoom lens satisfies Conditional Formulae (1'), (3''), (5'), (6'), (8'), and (9'). Note that Conditional Formula (3'') is more preferable than previously listed Conditional Formula (3').

Hereinafter, the aforementioned advantageous effects will be described in greater detail. Conditional Formula (1) determines the refractive index of the negative lens (the first lens L11) provided most toward the object side in the first lens group G1. In the case that the positive lens (the second lens L12) provided in the first lens group G1 is constituted by a plastic material having the optical properties indicated by Conditional Formula (2) and Conditional Formula (3) and the value of Nd1n is greater than or equal to the upper limit defined in Conditional Formula (1), the power of the first lens L11, which is the negative lens provided most toward the object side in the first lens group G1, and the power of the second lens L12, which is the positive lens in the first lens group G1, will become great. As a result, correction of spherical aberrations and coma aberrations becomes difficult, which is not preferable. Inversely, if the value of Nd1n is less than or equal to the lower limit defined in Conditional Formula (1), it becomes difficult to correct lateral chromatic aberration and astigmatic aberration in a balanced manner, which is not preferable. The above shortcomings can be prevented in the case that Conditional Formula (1) is satisfied. Further, an advantageous effect that application of comparatively inexpensive lens materials such as plastic is facilitated is obtained by satisfying Conditional Formula (1).

The present zoom lens satisfies Conditional Formula (1') within the range defined in Conditional Formula (1), and therefore the above advantageous effects are more prominent.

Conditional Formula (2) determines the refractive index of the positive lens (the second lens L12) formed by plastic provided in the first lens group G1. If the value of Nd1p is less than or equal to the lower limit defined in Conditional Formula (2), the radius of curvature (approximated radius of curvature) of the second lens will become great. As a result, the occurrence of various types of aberrations and lateral chromatic aberration will increase, which is not preferable. Inversely, if the value of Nd1p is greater than or equal to the upper limit defined in Conditional Formula (2), astigmatic aberration becomes great, which is not preferable. In addition, it becomes difficult to select a plastic material having favorable optical properties. The above shortcomings can be prevented in the case that Conditional Formula (2) is satisfied.

Conditional Formula (3) determines the Abbe's number of the positive lens (the second lens L12) formed by plastic provided in the first lens group G1. If the value of vd1p is less than or equal to the lower limit defined in Conditional Formula (3), it becomes difficult to correct longitudinal chromatic aberration and lateral chromatic aberration in a balanced manner, which is not preferable. Inversely, if the value of vd1p is greater than or equal to the upper limit defined in Conditional Formula (3), the difference in Abbe's numbers between the lens L11, which is the positive lens provided in the first lens group G1, and the negative lens provided in the first lens group G1 decreases, and it will become necessary to increase the power of the lenses in order to correct chromatic aberrations. As a result, correction of spherical aberration and astigmatic aberration will become difficult, which is not preferable. The above shortcomings can be prevented in the case that Conditional Formula (3) is satisfied.

The present zoom lens satisfies Conditional Formula (3'') within the range defined in Conditional Formula (3), and therefore the above advantageous effects are more prominent.

Conditional Formula (4) determines the relationship between the spatial distance between the negative lens and the positive lens of the first lens group G1, that is, the first lens L11 and the second lens L12, and the focal length of the entire system at the wide angle end. If the value of d2/fw is less than or equal to the lower limit defined in Conditional Formula (4), such a small distance is advantageous from the viewpoint of miniaturization, but is not preferable because correction of spherical aberration will became difficult. Inversely, if the value of d2/fw is greater than or equal to the upper limit defined in Conditional formula (4), the first lens group G1 will become large as a whole, which is not preferable. The above shortcomings can be prevented in the case that Conditional Formula (4) is satisfied.

In addition, the present zoom lens is configured to satisfy Conditional Formulae (2'), (3'), and (5) when Nd1p and vd1p are the refractive index and the Abbe's number of the second lens with respect to the d line, respectively, Y is a maximum image height, and TL is the distance along an optical axis when the first lens group is positioned most toward the object side. Therefore, a variable magnification ratio of approximately 3× can be secured with a small number of lenses, while achieving cost reduction by the use of plastic lenses, and realizing favorable optical performance.

Hereinafter, the aforementioned advantageous effects will be described in greater detail. The advantageous effects obtained by satisfying Conditional Formulae (2') and (3') are basically the same as those obtained by satisfying Conditional Formula (2) and (3), but are more prominent. In addition, the advantageous effects obtained by satisfying Conditional Formula (3') will become even more prominent, because the present zoom lens satisfies Conditional Formula (3'') within the range defined in Conditional Formula (3').

Conditional Formula (5) determines the product of the maximum image height and the total length of the optical system. If the value of Y·TL is greater than or equal to the upper limit defined in Conditional Formula (5), the size of a compact camera will increase, which is not preferable from the viewpoint of portability. Inversely, if the value of Y·TL is less than or equal to the lower limit defined in Conditional Formula (5), the zoom lens will become extremely compact, but the number of pixels of imaging elements that can be applied will decrease. Alternatively, if the number of pixels is maintained the same, the pixel size is decreased. In either case, image quality will deteriorate, which is not preferable.

The above shortcomings can be prevented in the case that Conditional Formula (5) is satisfied.

The above advantageous effects will become more prominent, because the present zoom lens satisfies Conditional Formula (5') is within the range defined in Conditional Formula (5).

In addition, the first lens group G1 of the present zoom lens is constituted only by the first lens L11 having the negative refractive power and the second lens 12 having the positive refractive power, provided in this order from the object size. Therefore, the number of lenses can be suppressed, and further cost reductions can be realized.

Meanwhile, the present zoom satisfies Conditional Formulae (6) and (7), and therefore the following advantageous effects can be obtained. That is, Conditional Formula (6) determines the refractive index of the negative lens (the fourth lens L22) provided in the second lens group. If the value of Nd2n is outside the range defined in Conditional Formula (6), it will become difficult to correct spherical aberrations and astigmatic aberrations in a balanced manner, which is not preferable. The above shortcomings can be prevented in the case that Conditional Formula (6) is satisfied.

The above advantageous effects are more prominent because the present zoom lens satisfies Conditional Formula (6') is satisfied within the range defined in Conditional Formula (6).

Conditional Formula (7) determines the Abbe's number of the negative lens (the fourth lens L22) provided in the second lens group. If the value of νd2n is outside the range defined in Conditional Formula (7), it will become difficult to correct longitudinal chromatic aberrations and lateral chromatic aberrations in a balanced manner within all zoom regions. The above shortcomings can be prevented in the case that Conditional Formula (7) is satisfied.

The present zoom lens realizes further cost reductions because the second lens group G2 comprises only one negative lens (the fourth lens L22), and the negative lens is a plastic lens.

The present zoom lens satisfies Conditional Formula (8), and therefore the following advantageous effects can be obtained. That is, Conditional Formula (8) determines the shape factor of the plastic lens (the second lens L12) having the positive refractive power provided in the first lens group G1. If the value of (Rpr+Rpf)/(Rpr−Rpf) is less than or equal to the lower limit defined in Conditional Formula (8), the powers of the negative lens and the positive lens provided in the first lens group G1, that is, the first lens L11 and the second lens L12, will become great. As a result, it will become difficult to correct spherical aberrations and coma aberrations in a balanced manner. Inversely, if the value of (Rpr+Rpf)/(Rpr−Rpf) is greater than or equal to the upper limit defined in Conditional Formula (8), the powers of the negative lens and the positive lens provided in the first lens group G1, that is, the first lens L11 and the second lens L12, will become excessively weak, and it will become difficult to correct longitudinal chromatic aberrations and lateral chromatic aberrations in a balanced manner. The above shortcomings can be prevented in the case that Conditional Formula (8) is satisfied.

The present zoom lens satisfies Conditional Formula (8') within the range defined in Conditional Formula (8), and therefore the above advantageous effects are more prominent.

In addition, in the present zoom lens, the second lens group G2 is constituted by two positive lenses (the third lens L21 and the fifth lens L23) and one negative lens (the fourth lens L22). Therefore, the advantageous effects related to cost reduction are more prominent.

Further, the advantageous effects related to cost reduction will also become more prominent in the case that the zoom lens of the present invention practically comprises only the first lens group and the second lens group.

In the zoom lens of the present invention, the following advantageous effects can be obtained particularly in the case that Conditional Formula (9) is satisfied. That is, if the value of νd1n is outside the range defined in Conditional Formula (9), it will become difficult to correct longitudinal chromatic aberrations and lateral chromatic aberrations in a balanced manner within all zoom regions, which is not preferable. The above shortcomings can be prevented in the case that Conditional Formula (9) is satisfied.

The above advantageous effects will, be more prominent, because the present zoom lens satisfies Conditional Formula (9') within the range defined in Conditional Formula (9).

The present zoom lens satisfies Conditional Formula (10), and therefore the following advantageous effects can be obtained. That is, if the value of M2/ft is less that or equal to the lower limit defined in Conditional Formula (10), it will become difficult to increase the variable magnification ratio. In addition, it will become necessary to increase the power of the second lens group G2, resulting in the tolerances for production error and assembly error becoming small, which is not preferable. Inversely, if the value of M2/ft is greater than or equal to the upper limit defined in Conditional Formula (10), the amount of movement of the second lens group G2 will become great, and the lens system will become large, which is not preferable. The above shortcomings can be prevented in the case that Conditional Formula (10) is satisfied.

The present zoom lens satisfies Conditional Formula (11), and therefore the following advantageous effects can be obtained. That is, if the value of d12t/d2gt is less that or equal to the lower limit defined in Conditional Formula (11), it will become difficult to avoid interference among the lenses that constitute the first lens group G1 and the second lens group G2, lens holding members, and the like, which is not preferable. Inversely, if the value of d12t/d2gt is greater than or equal to the upper limit defined in Conditional Formula (11), it will become difficult to obtain a desired variable magnification ratio while suppressing the total length of the optical system, which is not preferable. The above shortcomings can be prevented in the case that Conditional Formula (11) is satisfied.

In addition, the preset zoom lens satisfies Conditional Formula (12), and therefore the following advantageous effects can be obtained. That is, if the value of TLw/fw is less than or equal to the lower limit defined in Conditional Formula (12), the zoom lens can be configured to be compact. However, the power of each lens will become great, resulting in correction of aberrations becoming difficult. In addition, the tolerances for production error and assembly error will become small, which is not preferable. If the value of TLw/fw is greater than or equal to the upper limit defined in Conditional Formula (12), the total length of the optical system will become great, which is not preferable. The above shortcomings can be prevented in the case that Conditional Formula (12) is satisfied.

In addition, the present zoom lens satisfies Conditional Formulae (13) and (14), and therefore the following advantageous effects can be obtained. That is, if the value of Nd2p is less than or equal to the lower limit defined in Conditional Formula (13), the radius of curvature (approximated radius of curvature) of the second lens will become great. As a result, the central thickness will become great in order to secure a necessary flange (edge thickness), the second lens group G2 will become large, and the occurrence of various aberrations will increase, which is not preferable. Inversely, if the value of Nd2p is greater than or equal to the upper limit defined in Conditional Formula (13), it will become difficult to correct spherical aberrations in a balanced manner, which is not preferable. Meanwhile, if the value of value of vd2p is outside the range defined in Conditional Formula (14), it will become difficult to correct longitudinal chromatic aberrations and lateral chromatic aberrations in a balanced manner within all zoom regions, which is not preferable. The above shortcomings can be prevented in the case that Conditional Formulae (13) and (14) are satisfied.

In the present zoom lens, the entire lens system is constituted by five lenses or less, and all of the lenses of the lens system are plastic lenses. Therefore, the advantageous effects related to cost reduction will be more prominent.

Particularly in the configuration of FIG. 7, the second lens group G2 is constituted by only one positive lens and one negative lens (the third lens L21 and the fourth lens L22), and both of these lenses are plastic lenses. Therefore, the advantageous effects related to cost reduction will be more prominent.

The present zoom lens is of a configuration, in which the entirety of the second lens group is moved along the optical axis when focusing from infinity to a near distance. Therefore, the following advantageous effects can be obtained. That is, in the zoom type lens employed in the present invention, it is possible to obtain favorable optical performance regardless of whether the entirety of the first lens group G1, the entirety of the second lens group G2, or a portion of the lenses of the second lens group G2, is selected as the lenses to be moved during focusing operations. However, in the case that a configuration in which the entirety of the first lens group G1 is moved forward to focus, the effective diameter of the first lens group G1 will become large and it will become necessary to move lenses having large outer diameters. However, such problems can be avoided in the case that a configuration is adopted, in which the entirety of the second lens group G2 or a portion of the lenses of the second lens group G2 are moved to perform focusing operations.

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Next, examples of the numerical values of the zoom lens of the present invention will be described. The cross sections of the lenses of the zoom lenses of Examples 1 through 8 are those illustrated in FIGS. 1 through 8, respectively.

Regarding the zoom lens of Example 1, basic lens data are shown in Table 1, data related to zoom are shown in Table 2, and aspherical surface data are shown in Table 3. Similarly, basic lens data, data related to zoom, and aspherical surface data of the zoom lenses of Examples 2 through 8 are shown in Table 4 through Table 24. Hereinafter, the meanings of the items in the tables will be described for those related to Example 1. The same applies to the tables related to Examples 2 through 8.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Ri. Note that the signs of the radii of curvature are positive in cases that the surface shape is convex toward the object side, and negative in cases that the surface shape is convex toward the image side.

In the basic lens data, the item Ndj represents the refractive index of the jth (j=1, 2, 3, . . . ) constituent element that sequentially increases from the object side to the image side, with the lens at the most object side designated as first, with respect to the d line (wavelength: 587.6 nm). The item vdj represents the Abbe's number of the jth constituent element with respect to the d line. Note that the aperture stop St is also included in the basic lens data, and the radius of curvature of the surface corresponding to the aperture stop St is shown as "∞" (aperture stop).

D4 and D11 in the basic lens data of Table 1 represents the distances between surfaces that change when changing magnification. D4 is the distance between the first lens group G1 and the second lens group G2, and D11 is the distance between the second lens group G2 and the optical member PP. However, in Example 7, D9 is employed instead of D11.

The data of Table 2 related to zoom shows values of the focal length (f), the F value (Fno.), and the full angle of view (2ω) of the entire system and the distances among surfaces that change at the wide angle end and at the telephoto end.

In the lens data of Table 1, surface numbers of aspherical surfaces are denoted with the mark "*", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "$\cdot 10^{-n}$". Note that the aspherical surface coefficients are the values of the coefficients KA and Ram (m=3, 4, 5, . . . , 12) in the aspherical surface formula below:

$$Zd = C \cdot h^2 / \{1 + (1 - KA \cdot C^2 \cdot h^2)^{1/2}\} + \Sigma RAm \cdot h^2$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Ram are aspherical surface coefficients (m=1, 2, 3, . . . , 12).

The tables below show numerical values which are rounded off at a predetermined number of digits. In addition, degrees are used as the units for angles and mm are used as the units for lengths in the data of the tables below. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| *1 | −45.7782 | 1.50 | 1.53389 | 56.0 |
| *2 | 5.6000 | 2.60 | | |
| 3 | 9.3453 | 2.00 | 1.63355 | 23.6 |
| *4 | 15.9288 | D4 | | |
| 5 | ∞ (aperture stop) | 0.40 | | |
| *6 | 7.6622 | 2.80 | 1.53389 | 56.0 |
| 7 | −11.1702 | 0.23 | | |
| *8 | −93.6000 | 0.80 | 1.63355 | 23.6 |
| *9 | 10.0000 | 2.76 | | |
| *10 | −14.0449 | 1.30 | 1.53389 | 56.0 |

TABLE 1-continued

Example 1: Basic Lens Data

| Si (Surface Number) | Ri (Radius of Curvature) | Di (Distance) | Ndj (Refractive Index) | νdj (Abbe's Number) |
|---|---|---|---|---|
| *11 | −7.5692 | D11 | | |
| 12 | ∞ | 0.80 | 1.51680 | 64.2 |
| 13 | ∞ | 6.81 | | |

*Aspherical Surface

TABLE 2

Example 1: Data Related to Zoom

| Item | Wide Angle End | Telephoto End |
|---|---|---|
| f | 6.96 | 19.69 |
| Fno. | 4.05 | 6.22 |
| 2ω | 65.53 | 23.50 |
| D4 | 19.18 | 2.05 |
| D11 | 7.80 | 20.28 |

TABLE 3

Example 1: Aspherical Surface Coefficients

| Surface Number | | | |
|---|---|---|---|
| | 1 | 2 | 4 |
| KA | −7.1226025 | 0.6195752 | 0.0455753 |
| RA3 | 2.8527533E−03 | 1.3047539E−03 | 8.2616248E−05 |
| RA4 | −4.1473757E−04 | 1.9281865E−03 | −6.5096304E−04 |
| RA5 | 1.1199128E−04 | −1.1017867E−03 | 3.9845953E−04 |
| RA6 | 2.3620192E−05 | 4.1238273E−04 | −1.2520730E−04 |
| RA7 | −1.2231466E−05 | −6.2883982E−05 | 4.5479129E−06 |
| RA8 | −1.5116175E−06 | −2.2860711E−06 | 3.9213839E−06 |
| RA9 | 6.9957609E−07 | 7.0291982E−07 | −2.3604960E−07 |
| RA10 | 1.7009286E−08 | 7.4810093E−08 | −5.0184152E−08 |
| RA11 | −1.8368261E−08 | 1.5817690E−08 | −9.1998820E−09 |
| RA12 | 1.2875680E−09 | −4.6616729E−09 | 2.1005738E−09 |

| Surface Number | | | |
|---|---|---|---|
| | 6 | 8 | 9 |
| KA | −6.3422506 | −9.9709349 | −1.3798846 |
| RA3 | −7.0098873E−04 | 3.6107114E−03 | 3.8373369E−03 |
| RA4 | 2.9006712E−03 | −1.2306536E−03 | 7.4428967E−04 |
| RA5 | −1.2675233E−03 | 9.4348643E−04 | 1.8179553E−04 |
| RA6 | 2.8848355E−04 | −4.2578700E−04 | −5.1888543E−05 |
| RA7 | 4.0291067E−05 | −1.3836334E−04 | −5.9873513E−05 |
| RA8 | −8.9289567E−06 | 1.2562966E−05 | 2.7863066E−05 |

TABLE 3-continued

Example 1: Aspherical Surface Coefficients

| RA9 | −1.3182102E−05 | 3.7573813E−05 | 1.9831185E−05 |
|---|---|---|---|
| RA10 | 3.1220073E−06 | −6.6154532E−06 | −1.9975453E−06 |

| Surface Number | | |
|---|---|---|
| | 10 | 11 |
| KA | −0.5982977 | −1.4767948 |
| RA3 | 3.1690869E−03 | 2.8761485E−03 |
| RA4 | −1.1018539E−04 | −1.4342275E−03 |
| RA5 | −2.5170759E−04 | 1.3243839E−04 |
| RA6 | −1.3571412E−05 | 3.9758109E−06 |
| RA7 | −1.2394601E−05 | −2.1589979E−05 |
| RA8 | −3.2572811E−06 | −5.7942241E−06 |
| RA9 | −3.7427885E−06 | 1.5121874E−06 |
| RA10 | 4.1063227E−06 | 1.4766951E−06 |

TABLE 4

Example 2: Basic Lens Data

| Si (Surface Number) | Ri (Radius of Curvature) | Di (Distance) | Ndj (Refractive Index) | νdj (Abbe's Number) |
|---|---|---|---|---|
| *1 | −24.4474 | 0.88 | 1.49023 | 57.5 |
| *2 | 3.3819 | 1.08 | | |
| 3 | 5.7960 | 1.29 | 1.62300 | 23.9 |
| *4 | 8.6181 | D4 | | |
| 5 | ∞ (aperture stop) | 1.17 | | |
| *6 | 4.1412 | 1.44 | 1.49023 | 57.5 |
| 7 | −5.4394 | 0.13 | | |
| *8 | −28.8545 | 0.54 | 1.61000 | 27.5 |
| *9 | 5.8404 | 1.75 | | |
| *10 | −9.7178 | 0.81 | 1.53389 | 56.0 |
| *11 | −4.9719 | D11 | | |
| 12 | ∞ | 0.47 | 1.51680 | 64.2 |
| 13 | ∞ | 5.01 | | |

*Aspherical Surface

TABLE 5

Example 2: Data Related to Zoom

| Item | Wide Angle End | Telephoto End |
|---|---|---|
| f | 4.24 | 11.99 |
| Fno. | 4.30 | 6.53 |
| 2ω | 59.52 | 21.13 |
| D4 | 10.58 | 1.06 |
| D11 | 3.69 | 11.50 |

TABLE 6

Example 2: Aspherical Surface Coefficients

| Surface Number | | | |
|---|---|---|---|
| | 1 | 2 | 3 |
| KA | −7.1446350 | 0.7117550 | 0.0493759 |
| RA3 | 1.6022406E−02 | 1.2449006E−02 | −1.7913828E−03 |
| RA4 | −2.8230074E−03 | 1.1832579E−02 | −4.0043994E−03 |
| RA5 | 7.9442811E−04 | −9.0809084E−03 | 2.8944886E−03 |
| RA6 | 3.4187424E−04 | 6.0446252E−03 | −1.8472108E−03 |
| RA7 | −3.3809595E−04 | −1.6385012E−03 | 1.2829162E−04 |
| RA8 | −6.5570814E−05 | −9.9309361E−05 | 1.7000076E−04 |
| RA9 | 5.4086217E−05 | 5.0384035E−05 | −1.5692174E−05 |
| RA10 | 2.2388992E−06 | 9.4466499E−06 | −6.3004678E−06 |

TABLE 6-continued

Example 2: Aspherical Surface Coefficients

| | | | |
|---|---|---|---|
| RA11 | −3.9356475E−06 | 3.2305639E−06 | −2.3754316E−06 |
| RA12 | 4.4535967E−07 | −1.7753076E−06 | 7.8810892E−07 |

| | Surface Number | | | |
|---|---|---|---|---|
| | 6 | 8 | 9 | 11 |
| KA | −6.1966713 | −9.0475991 | −1.4238482 | −1.4941658 |
| RA3 | −1.4409958E−03 | 9.0125124E−03 | 1.0259361E−02 | 7.9054678E−03 |
| RA4 | 1.5452861E−02 | −6.3014614E−03 | 3.1211832E−03 | −7.2949415E−03 |
| RA5 | −1.0829388E−02 | 7.5090537E−03 | 1.1775347E−03 | 1.3751035E−03 |
| RA6 | 4.2199686E−03 | −6.2715736E−03 | −7.6297217E−03 | 5.6543370E−05 |
| RA7 | 9.8971113E−04 | −3.4924484E−03 | −1.5018386E−03 | −5.5833924E−04 |
| RA8 | −3.7920291E−04 | 5.5063353E−04 | 1.2117198E−03 | −2.5565732E−04 |
| RA9 | −9.6512089E−04 | 2.7737290E−03 | 1.4426408E−03 | 1.1435647E−04 |
| RA10 | 3.9060334E−04 | −8.4849466E−04 | −2.4669196E−04 | 1.9046824E−04 |

TABLE 7

Example 3: Basic Lens Data

| Si (Surface Number) | Ri (Radius of Curvature) | Di (Distance) | Ndj (Refractive Index) | νdj (Abbe's Number) |
|---|---|---|---|---|
| *1 | −254.1493 | 2.34 | 1.53389 | 56.0 |
| *2 | 10.3588 | 5.14 | | |
| 3 | 19.0564 | 2.80 | 1.64800 | 20.0 |
| *4 | 26.6475 | D4 | | |
| 5 | ∞ (aperture stop) | 2.03 | | |
| *6 | 11.0135 | 4.15 | 1.64000 | 47.0 |
| 7 | −27.3956 | 0.23 | | |
| *8 | −24.6348 | 2.34 | 1.63355 | 23.6 |
| *9 | 24.9496 | 4.67 | | |
| *10 | −18.8495 | 2.02 | 1.53389 | 56.0 |
| *11 | −12.5406 | D11 | | |
| 12 | ∞ | 1.25 | 1.51680 | 64.2 |
| 13 | ∞ | 16.95 | | |

*Aspherical Surface

TABLE 8

Example 3: Data Related to Zoom

| Item | Wide Angle End | Telephoto End |
|---|---|---|
| f | 10.56 | 39.80 |
| Fno. | 4.20 | 7.29 |
| 2ω | 63.84 | 17.06 |
| D4 | 38.22 | 0.83 |
| D11 | 4.54 | 32.03 |

TABLE 9

Example 3: Aspherical Surface Coefficients

| | Surface Number | | |
|---|---|---|---|
| | 1 | 2 | 4 |
| KA | 0.4265106 | 1.1005323 | −0.3047225 |
| RA3 | 1.0032316E−03 | 3.3994625E−04 | 2.6383815E−04 |
| RA4 | −8.1057546E−05 | 4.8599520E−04 | −3.3692057E−04 |
| RA5 | 2.5042680E−05 | −1.6109963E−05 | 1.0014716E−04 |
| RA6 | 2.9921605E−06 | 4.4035348E−05 | −1.4124732E−05 |
| RA7 | −1.1149005E−06 | −5.1375038E−06 | −1.1167345E−07 |
| RA8 | −7.2929416E−08 | −1.0636232E−07 | 1.7826466E−07 |
| RA9 | 2.0758191E−08 | 2.4173644E−08 | −1.2396842E−09 |
| RA10 | 4.7212173E−10 | 1.3201382E−09 | −8.0134068E−10 |

TABLE 9-continued

Example 3: Aspherical Surface Coefficients

| | | | |
|---|---|---|---|
| RA11 | −2.0159843E−10 | 2.3962978E−10 | −1.4974790E−10 |
| RA12 | 7.8556440E−12 | −3.5327902E−11 | 1.4711720E−11 |

| | Surface Number | | |
|---|---|---|---|
| | 6 | 8 | 9 |
| KA | −5.7282980 | 0.1004209 | −0.9433058 |
| RA3 | −1.8371353E−04 | 1.8866142E−04 | 2.0665075E−05 |
| RA4 | 9.0704795E−04 | 1.0185960E−04 | 6.4123511E−04 |
| RA5 | −1.9611979E−04 | 1.7580256E−04 | 7.7402734E−05 |
| RA6 | 3.0493914E−05 | −4.5821573E−05 | −5.2740251E−05 |
| RA7 | 2.2797495E−06 | −9.2026036E−06 | −2.6103119E−06 |
| RA8 | −4.1298096E−07 | 7.2496582E−07 | 1.0486835E−06 |
| RA9 | −3.2870401E−07 | 1.0776877E−06 | 5.5087211E−07 |
| RA10 | 5.1216116E−08 | −1.4825265E−07 | −5.3392266E−08 |

| | Surface Number | |
|---|---|---|
| | 10 | 11 |
| KA | −1.9563947 | −2.5460405 |
| RA3 | 7.9279449E−04 | 8.1883206E−04 |
| RA4 | −2.5537471E−04 | −4.4408336E−04 |
| RA5 | −5.8357584E−07 | 1.8249801E−05 |
| RA6 | −2.2595077E−06 | −1.0635010E−06 |
| RA7 | −1.8902953E−06 | −1.5948402E−06 |
| RA8 | −3.6905622E−07 | −1.3723835E−07 |
| RA9 | −5.3722330E−08 | 4.0858764E−08 |
| RA10 | 8.7556950E−08 | 2.7676528E−08 |

TABLE 10

Example 4: Basic Lens Data

| Si (Surface Number) | Ri (Radius of Curvature) | Di (Distance) | Ndj (Refractive Index) | νdj (Abbe's Number) |
|---|---|---|---|---|
| *1 | −1876.4986 | 1.70 | 1.69350 | 53.2 |
| *2 | 6.3473 | 2.95 | | |
| 3 | 9.5225 | 2.36 | 1.61000 | 24.8 |
| *4 | 19.8080 | D4 | | |
| 5 | ∞ (aperture stop) | 0.77 | | |
| *6 | 9.4426 | 3.17 | 1.61800 | 63.3 |
| 7 | −21.2996 | 0.25 | | |
| *8 | 55.6927 | 0.91 | 1.68000 | 21.0 |
| *9 | 11.5511 | 3.27 | | |
| *10 | −12.2857 | 1.47 | 1.53389 | 56.0 |
| *11 | −8.1755 | D11 | | |

TABLE 10-continued

Example 4: Basic Lens Data

| Si (Surface Number) | Ri (Radius of Curvature) | Di (Distance) | Ndj (Refractive Index) | νdj (Abbe's Number) |
|---|---|---|---|---|
| 12 | ∞ | 0.91 | 1.51680 | 64.2 |
| 13 | ∞ | 8.44 | | |

*Aspherical Surface

TABLE 11

Example 4: Data Related to Zoom

| Item | Wide Angle End | Telephoto End |
|---|---|---|
| f | 7.57 | 21.39 |
| Fno. | 4.20 | 6.24 |
| 2ω | 67.66 | 24.47 |
| D4 | 21.74 | 2.39 |
| D11 | 7.54 | 21.50 |

TABLE 12

Example 4: Aspherical Surface Coefficients

| | Surface Number | | |
|---|---|---|---|
| | 1 | 2 | 4 |
| KA | −6.8925582 | 0.5606145 | 0.0640261 |
| RA3 | 1.0134712E−03 | −4.2717211E−04 | 3.4601040E−04 |
| RA4 | −2.5372115E−04 | 1.2593049E−03 | −4.1702007E−04 |
| RA5 | 7.5804235E−05 | −6.7904394E−04 | 2.5907829E−04 |
| RA6 | 1.2778441E−05 | 2.2054081E−04 | −6.6791139E−05 |
| RA7 | −5.6581202E−06 | −2.9489165E−05 | 2.1607090E−06 |
| RA8 | −6.2990711E−07 | −9.4991526E−07 | 1.6302199E−06 |
| RA9 | 2.5344901E−07 | 2.5950034E−07 | −8.8859148E−08 |
| RA10 | 5.4784820E−09 | 2.4237174E−08 | −1.6310670E−08 |
| RA11 | −5.2219884E−09 | 4.7692548E−09 | −2.6217261E−09 |
| RA12 | 3.2521430E−10 | −1.1691669E−09 | 5.3169108E−10 |

| | Surface Number | | |
|---|---|---|---|
| | 6 | 8 | 9 |
| KA | −6.4155017 | −8.3998807 | −1.3677162 |
| RA3 | −7.5831588E−04 | 2.9911714E−03 | 2.8487763E−03 |
| RA4 | 1.9278126E−03 | −8.4109842E−04 | 5.4263721E−04 |
| RA5 | −7.3363678E−04 | 5.7593331E−04 | 1.2404501E−04 |
| RA6 | 1.5426968E−04 | −2.2765784E−04 | −2.7681668E−04 |
| RA7 | 1.9155313E−05 | −6.5139697E−05 | −2.8270192E−05 |
| RA8 | −3.7003234E−06 | 5.3001996E−06 | 1.1574456E−05 |

TABLE 12-continued

Example 4: Aspherical Surface Coefficients

| RA9 | −4.8140372E−06 | 1.3819953E−05 | 7.2262467E−06 |
|---|---|---|---|
| RA10 | 1.0051357E−06 | −2.1630409E−06 | −6.2745081E−07 |

| | Surface Number | |
|---|---|---|
| | 10 | 11 |
| KA | −0.6204240 | −1.6144219 |
| RA3 | 2.7245717E−03 | 2.4121701E−03 |
| RA4 | −4.8677068E−05 | −9.0836913E−04 |
| RA5 | −1.4216808E−04 | 8.9380592E−05 |
| RA6 | −7.2701757E−06 | 2.2493087E−06 |
| RA7 | −5.6185952E−06 | −1.0357215E−05 |
| RA8 | −1.1731585E−06 | −2.4882905E−06 |
| RA9 | −1.3942546E−06 | 5.5156441E−07 |
| RA10 | 1.3301940E−06 | 4.9104774E−07 |

TABLE 13

Example 5: Basic Lens Data

| Si (Surface Number) | Ri (Radius of Curvature) | Di (Distance) | Ndj (Refractive Index) | νdj (Abbe's Number) |
|---|---|---|---|---|
| *1 | 4622.3228 | 1.10 | 1.61881 | 63.9 |
| *2 | 4.6769 | 1.85 | | |
| *3 | 5.4284 | 1.34 | 1.63355 | 23.6 |
| *4 | 7.9718 | D4 | | |
| 5 | ∞ (aperture stop) | 0.47 | | |
| *6 | 7.4389 | 1.45 | 1.55000 | 52.0 |
| 7 | −6.4636 | 0.12 | | |
| *8 | −185.1758 | 0.63 | 1.63355 | 23.6 |
| *9 | 5.7991 | 1.57 | | |
| *10 | −7.9402 | 1.18 | 1.55000 | 52.0 |
| *11 | −4.4075 | D11 | | |
| 12 | ∞ | 0.63 | 1.51680 | 64.2 |
| 13 | ∞ | 4.93 | | |

*Aspherical Surface

TABLE 14

Example 5: Data Related to Zoom

| Item | Wide Angle End | Telephoto End |
|---|---|---|
| f | 5.34 | 12.83 |
| Fno. | 4.20 | 5.50 |
| 2ω | 65.07 | 27.88 |
| D4 | 15.30 | 2.27 |
| D11 | 7.00 | 13.45 |

TABLE 15

Example 5: Aspherical Surface Coefficients

| | Surface Number | | |
|---|---|---|---|
| | 1 | 2 | 3 |
| KA | 5.5505612 | 1.0608379 | 0.2649910 |
| RA3 | 4.2497242E−03 | 4.3032982E−03 | 7.4737823E−04 |
| RA4 | −4.4717766E−03 | −4.4097098E−03 | −1.8709297E−03 |
| RA5 | 2.5765441E−03 | 2.8302594E−04 | 2.2256072E−04 |
| RA6 | −3.3743127E−04 | 1.4302833E−03 | 4.9060799E−05 |
| RA7 | −4.6973970E−05 | −4.5466316E−04 | 2.7685188E−06 |
| RA8 | −6.5368423E−06 | −1.0119830E−05 | 1.8316374E−06 |
| RA9 | 5.5602495E−06 | 1.1176599E−05 | −6.7417456E−07 |
| RA10 | 1.5755642E−07 | 8.0327374E−07 | −2.1205117E−08 |

TABLE 15-continued

Example 5: Aspherical Surface Coefficients

| | | | |
|---|---|---|---|
| RA11 | −2.2796988E−07 | 7.6512467E−08 | 0.0000000E+00 |
| RA12 | 1.9538575E−08 | −7.6061718E−08 | 0.0000000E+00 |

| | Surface Number | | | |
|---|---|---|---|---|
| | 6 | 8 | 9 | 11 |
| KA | −8.8229383 | 8.6939192 | −3.2869260 | 1.4535087 |
| RA3 | −3.0449151E−03 | 1.5469360E−02 | 1.6570891E−02 | 2.3725402E−03 |
| RA4 | 4.3501116E−03 | −1.5157926E−02 | −1.1022800E−02 | 1.2106795E−04 |
| RA5 | −4.2908897E−03 | 8.0865106E−03 | 5.3742409E−03 | −3.8666847E−04 |
| RA6 | 9.4657434E−04 | −1.5133114E−03 | −1.8093908E−03 | −3.0678433E−05 |
| RA7 | 1.8715521E−04 | −7.8622129E−04 | −3.9555846E−04 | −1.1518217E−05 |
| RA8 | −4.2805087E−05 | 6.5251898E−05 | 1.4974213E−04 | −5.9354826E−07 |
| RA9 | −7.7925970E−05 | 2.5269327E−04 | 1.1524512E−04 | 1.5733921E−05 |
| RA10 | 2.3490028E−05 | −6.7335763E−05 | −2.9727366E−05 | 6.7281007E−07 |

TABLE 16

Example 6: Basic Lens Data

| Si (Surface Number) | Ri (Radius of Curvature) | Di (Distance) | Ndj (Refractive Index) | νdj (Abbe's Number) |
|---|---|---|---|---|
| *1 | −33.5212 | 1.50 | 1.53389 | 56.0 |
| *2 | 5.6000 | 2.55 | | |
| 3 | 17.6534 | 2.00 | 1.63355 | 23.6 |
| *4 | 65.6105 | D4 | | |
| 5 | ∞ (aperture stop) | 0.65 | | |
| *6 | 6.1159 | 2.80 | 1.53389 | 56.0 |
| 7 | −15.2820 | 0.10 | | |
| *8 | −27.7306 | 1.50 | 1.63355 | 23.6 |
| *9 | 14.6374 | 2.90 | | |
| *10 | −36.6863 | 1.30 | 1.53389 | 56.0 |
| *11 | −13.3980 | D11 | | |
| 12 | ∞ | 0.80 | 1.51680 | 64.2 |
| 13 | ∞ | 6.16 | | |

*Aspherical Surface

TABLE 17

Example 6: Data Related to Zoom

| Item | Wide Angle End | Telephoto End |
|---|---|---|
| f | 7.39 | 20.90 |
| Fno. | 4.15 | 6.75 |
| 2ω | 62.52 | 22.24 |
| D4 | 15.58 | 1.39 |
| D11 | 7.30 | 21.10 |

TABLE 18

Example 6: Aspherical Surface Coefficients

| | Surface Number | | |
|---|---|---|---|
| | 1 | 2 | 4 |
| KA | −8.5520832 | 0.3236360 | 0.6238980 |
| RA3 | 2.1047987E−03 | 1.0458336E−03 | 1.0617846E−04 |
| RA4 | −1.9644974E−04 | 2.0032234E−03 | −8.1589269E−04 |
| RA5 | 9.3174106E−05 | −9.2768197E−04 | 3.6540174E−04 |
| RA6 | 2.6302088E−05 | 4.1267344E−04 | −1.2439809E−04 |
| RA7 | −1.2312766E−05 | −6.3809274E−05 | 4.8557486E−06 |
| RA8 | −1.5632324E−06 | −2.2583743E−06 | 3.8818995E−06 |
| RA9 | 6.8470834E−07 | 6.9915747E−07 | −2.8647988E−07 |
| RA10 | 1.8895963E−08 | 7.2596228E−08 | −4.5210233E−08 |

TABLE 18-continued

Example 6: Aspherical Surface Coefficients

| | | | |
|---|---|---|---|
| RA11 | −1.8078087E−09 | 1.5232335E−08 | −8.5939912E−09 |
| RA12 | 1.2303155E−09 | −4.8569233E−09 | 1.9026857E−09 |

| | Surface Number | | |
|---|---|---|---|
| | 6 | 8 | 9 |
| KA | −4.8174972 | −5.3168915 | −0.4058666 |
| RA3 | −5.5392091E−04 | 1.4898350E−03 | 1.0829455E−03 |
| RA4 | 4.1141380E−03 | −2.6410099E−04 | 1.9599784E−03 |
| RA5 | −1.3115195E−03 | 1.2274352E−03 | 6.0156282E−04 |
| RA6 | 2.7723108E−04 | −4.0694402E−04 | −5.024068E−04 |
| RA7 | 3.5539920E−05 | −1.3393890E−04 | −3.7700207E−05 |
| RA8 | −7.5774948E−06 | 1.3976679E−05 | 3.2558188E−05 |
| RA9 | −1.2104632E−05 | 3.5788480E−05 | 1.7743978E−05 |
| RA10 | 2.7537362E−06 | −7.5131653E−06 | −4.0564322E−06 |

| | Surface Number | |
|---|---|---|
| | 10 | 11 |
| KA | −7.5521587 | −2.0348310 |
| RA3 | 1.3804517E−03 | 1.9024088E−03 |
| RA4 | 1.8930151E−04 | −8.2553798E−04 |
| RA5 | −1.3660548E−04 | 2.1510822E−04 |
| RA6 | −1.4392098E−05 | 8.5950340E−06 |
| RA7 | −1.4559266E−05 | −2.2984831E−05 |
| RA8 | −3.7430497E−06 | −8.3785420E−06 |
| RA9 | −4.8932164E−06 | 3.7168196E−07 |
| RA10 | 3.9425340E−06 | 1.7763257E−06 |

TABLE 19

Example 7: Basic Lens Data

| Si (Surface Number) | Ri (Radius of Curvature) | Di (Distance) | Ndj (Refractive Index) | νdj (Abbe's Number) |
|---|---|---|---|---|
| *1 | −22.4371 | 1.10 | 1.49023 | 57.5 |
| *2 | 6.5700 | 2.29 | | |
| *3 | 6.8084 | 1.67 | 1.63355 | 23.6 |
| *4 | 9.7661 | D4 | | |
| 5 | ∞ (aperture stop) | 0.40 | | |
| *6 | 5.6000 | 3.20 | 1.49023 | 57.5 |
| 7 | −7.8503 | 0.32 | | |
| *8 | −6.2454 | 1.20 | 1.63355 | 23.6 |
| *9 | −19.3121 | D9 | | |
| 10 | ∞ | 0.80 | 1.51680 | 64.2 |
| 11 | ∞ | 7.43 | | |

*Aspherical Surface

TABLE 20

Example 7: Data Related to Zoom

| Item | Wide Angle End | Telephoto End |
|---|---|---|
| f | 6.83 | 19.32 |
| Fno. | 4.06 | 6.25 |
| 2ω | 64.39 | 23.46 |
| D4 | 20.00 | 1.72 |
| D9 | 5.65 | 14.80 |

TABLE 21

Example 7: Aspherical Surface Coefficients

Surface Number

| | 1 | 2 | 3 | 4 |
|---|---|---|---|---|
| KA | −9.7780633 | −0.4996645 | −1.3403884 | −0.9413769 |
| RA3 | −3.4287750E−03 | −5.9826274E−03 | −1.6143319E−03 | −6.9413781E−05 |
| RA4 | 4.0029165E−03 | 6.0064687E−03 | 5.0451395E−04 | −1.4215029E−03 |
| RA5 | −8.5764331E−04 | −1.5230887E−03 | −3.4183912E−04 | 4.5928562E−04 |
| RA6 | 8.2086269E−05 | 1.9098931E−04 | 1.1146784E−04 | −3.7661431E−05 |
| RA7 | −3.4960467E−08 | 1.7027340E−05 | −1.1830129E−05 | −2.6559468E−05 |
| RA8 | −6.9980109E−07 | −1.0766751E−06 | −1.1912659E−06 | 6.8011956E−07 |
| RA9 | 4.9719397E−09 | −9.1139825E−07 | −3.6922285E−07 | 6.3641757E−07 |
| RA10 | 5.4826365E−29 | −1.4419920E−08 | 9.9000919E−09 | 7.2490547E−09 |
| RA11 | 5.4738384E−10 | 1.2871048E−08 | 7.6408420E−09 | −4.5911110E−09 |
| RA12 | −9.316006E−11 | 9.7757450E−10 | 1.1573077E−09 | −2.6347093E−10 |

Surface Number

| | 6 | 8 | 9 |
|---|---|---|---|
| KA | −5.0839983 | −10.0000000 | −2.8192836 |
| RA3 | 4.8461663E−05 | 1.6689299E−03 | 1.2263102E−03 |
| RA4 | 3.6470332E−03 | −2.6497715E−03 | 3.8200541E−03 |
| RA5 | −9.9229056E−05 | 1.6954148E−03 | 9.0671334E−04 |
| RA6 | −2.1064551E−04 | 1.2861164E−04 | −1.7064198E−04 |
| RA7 | −3.7231760E−05 | −3.8650275E−05 | −3.5444649E−06 |
| RA8 | 1.4618282E−05 | −2.3045334E−05 | 6.4585099E−06 |
| RA9 | 6.7879963E−07 | 8.5284758E−07 | 4.7698737E−06 |
| RA10 | −4.8376254E−07 | 1.5223326E−06 | −1.3330190E−06 |

TABLE 22

Example 8: Basic Lens Data

| Si (Surface Number) | Ri (Radius of Curvature) | Di (Distance) | Ndj (Refractive Index) | vdj (Abbe's Number) |
|---|---|---|---|---|
| *1 | −38.0636 | 1.50 | 1.53389 | 56.0 |
| *2 | 5.6000 | 2.60 | | |
| 3 | 9.0413 | 2.20 | 1.63355 | 23.6 |
| *4 | 15.8402 | D4 | | |
| 5 | ∞ (aperture stop) | 0.40 | | |
| *6 | 7.6194 | 2.80 | 1.53389 | 56.0 |
| 7 | −10.1927 | 0.23 | | |
| *8 | −85.4094 | 0.83 | 1.63355 | 23.6 |
| *9 | 10.0000 | 2.92 | | |
| *10 | −12.2543 | 1.30 | 1.53389 | 56.0 |
| *11 | −7.8625 | D11 | | |
| 12 | 70.0000 | 1.50 | 1.53389 | 56.0 |
| 13 | −70.0000 | 2.00 | | |
| 14 | ∞ | 0.80 | 1.51680 | 64.2 |
| 15 | ∞ | 3.01 | | |

*Aspherical Surface

TABLE 23

Example 8: Data Related to Zoom

| Item | Wide Angle End | Telephoto End |
|---|---|---|
| f | 6.87 | 19.44 |
| Fno. | 3.91 | 6.19 |
| 2ω | 66.29 | 23.79 |
| D4 | 18.32 | 2.10 |
| D11 | 8.57 | 22.41 |

TABLE 24

Example 8: Aspherical Surface Coefficients

Surface Number

| | 1 | 2 | 4 |
|---|---|---|---|
| KA | −7.1164362 | 0.6720648 | 0.0379012 |
| RA3 | 2.6929571E−03 | 9.6824859E−04 | 1.7923203E−04 |
| RA4 | −4.1477171E−04 | 1.8887758E−03 | −6.4318302E−04 |
| RA5 | 1.1209763E−04 | −1.1313039E−03 | 4.1339259E−04 |
| RA6 | 2.3721969E−05 | 4.1219549E−04 | −1.2542582E−04 |
| RA7 | −1.2190763E−05 | −6.2870121E−05 | 4.4722605E−06 |
| RA8 | −1.5106780E−06 | −2.2817305E−06 | 3.9266356E−06 |
| RA9 | 7.0067013E−07 | 7.1253827E−07 | −2.3023798E−07 |
| RA10 | 1.7288758E−08 | 7.4891059E−08 | −4.9930149E−08 |
| RA11 | −1.8457994E−08 | 1.5400707E−08 | −9.3670858E−09 |
| RA12 | 1.2893764E−09 | −4.6624920E−09 | 2.1247390E−09 |

Surface Number

| | 6 | 8 | 9 |
|---|---|---|---|
| KA | −6.3086236 | −9.7297025 | −1.3721126 |
| RA3 | −6.8201615E−04 | 2.8627167E−03 | 2.8256993E−03 |
| RA4 | 2.9473576E−03 | −1.2864068E−03 | 8.1929015E−04 |
| RA5 | −1.2731036E−03 | 9.5589613E−04 | 1.7509953E−04 |
| RA6 | 2.8853474E−04 | −4.2569003E−04 | −5.1889438E−04 |
| RA7 | 4.0347536E−05 | −1.3836245E−04 | −5.9602836E−05 |
| RA8 | −8.7621366E−06 | 1.2429741E−05 | 2.8085048E−05 |

TABLE 24-continued

Example 8: Aspherical Surface Coefficients

| RA9  | −1.3098291E−05 | 3.7728395E−05  | 1.9746133E−05  |
| RA10 | 3.0558000E−06  | −6.6240394E−06 | −1.9771091E−06 |

| | Surface Number | |
| --- | --- | --- |
| | 10 | 11 |
| KA   | −0.6225262     | −1.5218459     |
| RA3  | 3.0606997E−03  | 2.9863925E−03  |
| RA4  | −7.1256446E−05 | −1.3693416E−03 |
| RA5  | −2.3298060E−04 | 1.5896493E−04  |
| RA6  | −1.3454034E−05 | 4.2436758E−06  |
| RA7  | −1.2423190E−05 | −2.1561410E−05 |
| RA8  | −3.4076060E−06 | −5.7011493E−06 |
| RA9  | −3.6503543E−06 | 1.4337474E−06  |
| RA10 | 4.0759943E−06  | 1.4707469E−06  |

Table 25 shows values corresponding to Conditional Formulae (1) through (14) of the zoom lenses of Examples 1 through 8. The values in Table 25 are related to the d line.

TABLE 25

Values Related to Conditional Formulae

| | Example 1 | Example 2 | Example 3 | Example 4 | Example 5 | Example 6 | Example 7 | Example 8 |
| --- | --- | --- | --- | --- | --- | --- | --- | --- |
| (1) Nd1n | 1.534 | 1.490 | 1.534 | 1.694 | 1.619 | 1.534 | 1.490 | 1.534 |
| (2) Nd1p | 1.634 | 1.623 | 1.648 | 1.610 | 1.634 | 1.634 | 1.634 | 1.634 |
| (3) vd1p | 23.6 | 23.9 | 20 | 24.8 | 23.6 | 23.6 | 23.6 | 23.6 |
| (4) d2/fw | 0.37 | 0.25 | 0.49 | 0.39 | 0.35 | 0.35 | 0.33 | 0.38 |
| (5) Y · TL | 200.9 | 64.9 | 519 | 258 | 118.4 | 185.1 | 176.3 | 200.9 |
| (6) Nd2n | 1.634 | 1.610 | 1.634 | 1.680 | 1.680 | 1.634 | 1.634 | 1.634 |
| (7) vd2n | 23.6 | 27.5 | 23.6 | 21.0 | 23.6 | 23.6 | 23.6 | 23.6 |
| (8) (Rpr + Rpf)/(Rpr − Rpf) | 3.84 | 5.11 | 6.02 | 2.85 | 5.27 | 1.74 | 5.60 | 3.66 |
| (9) vd1n | 56.0 | 57.5 | 56.0 | 53.2 | 63.9 | 56.0 | 57.5 | 56.0 |
| (10) M2/ft | 0.63 | 0.65 | 0.68 | 0.74 | 0.50 | 0.66 | 0.47 | 0.71 |
| (11) d12t/d2gt | 0.31 | 0.48 | 0.25 | 0.34 | 0.55 | 0.24 | 0.57 | 0.31 |
| (12) TLw/fw | 7.04 | 6.81 | 8.22 | 7.34 | 7.03 | 6.12 | 6.45 | 7.13 |
| (13) Nd2p | 1.534 | 1.490 | 1.640 | 1.618 | 1.550 | 1.534 | 1.490 | 1.534 |
| (14) vd2p | 56.0 | 57.5 | 47.0 | 63.3 | 52.0 | 56.0 | 57.5 | 56.0 |

The spherical aberration, the astigmatic aberration, the distortion, and the lateral chromatic aberration of the zoom lens of Example 1 at the wide angle end are illustrated in A through D of FIG. 9, respectively. The spherical aberration, the astigmatic aberration, the distortion, and the lateral chromatic aberration of the zoom lens of Example 1 at the telephoto end are illustrated in E through H of FIG. 9, respectively.

Each of the diagrams that illustrate the aberrations use the d line (wavelength: 587.6 nm) as a standard. However, in the diagrams that illustrate spherical aberration, aberrations related to wavelengths of 460.0 nm and 615.0 nm are also shown. In addition, the diagrams that illustrate lateral chromatic aberration also show aberrations related to wavelengths of 460.0 nm and 615.0 nm. In the diagrams that illustrate astigmatic aberrations, aberrations in the sagittal direction are indicated by solid lines, while aberrations in the tangential direction are indicated by broken lines. In the diagrams that illustrate spherical aberrations, "Fno." denotes F values. In the other diagrams that illustrate the aberrations, ω denotes half angles of view.

Similarly, the aberrations of the zoom lens of Example 2 are illustrated in A through H of FIG. 10. In addition, the aberrations of the zoom lenses of Examples 3 through 11 are illustrated in FIG. 11 through FIG. 16.

Next, an imaging apparatus according to an embodiment of the present invention will be described. FIG. 17 is a diagram that schematically illustrates an imaging apparatus 10 according to the embodiment of the present invention that employs the zoom lens 1 of the embodiment of the present invention. The imaging apparatus may be a surveillance camera, a video camera, an electronic still camera, or the like.

The imaging apparatus 10 illustrated in FIG. 17 is equipped with: the zoom lens 1; an imaging element 2 that captures images of subjects focused by the zoom lens 1, provided toward the image side of the zoom lens 1; a signal processing section 4 that processes signals output from the imaging element 2; a magnification control section 5 that changes the magnification of the zoom lens 1; and a focus control section 6 that performs focus adjustments. Note that various filters and the like may be provided between the zoom lens 1 and the imaging element 2 as appropriate.

The zoom lens 1 has the first lens group G1 having a negative refractive power and the second lens group G2 having a positive refractive power. The zoom lens 1 is configured to change magnification by changing the distance between the first lens group G1 and the second lens group G2. The first lens group G1 is constituted by two lenses, the first lens L11 having a negative refractive power and the second lens L12 having a positive refractive power. Both of the lenses L1 and L12 are plastic lenses.

The imaging element 2 captures an optical image formed by the zoom lens 1 and outputs electrical signals. The imaging surface thereof is provided to match the imaging plane of the zoom lens 1. A CCD, a CMOS, or the like may be employed as the imaging element 2.

Note that although not illustrated in FIG. 17, the imaging apparatus 10 may be further equipped with a blur correcting mechanism that moves a lens having a positive refractive power that constitutes a portion of the second lens group G2 in a direction perpendicular to the optical axis Z in order to correct blurring of obtained images due to vibration or shaky hands.

The present invention has been described with reference to the embodiments and Examples thereof. However, the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

What is claimed is:

1. A zoom lens, comprising:
a first lens group having a negative refractive power; and
a second lens group having a positive refractive power, provided in this order from an object side;
the distance between the first lens group and the second lens group changing when changing magnification;
the first lens group comprising a first lens having a negative refractive power and a second lens, which is plastic, having a positive refractive power; and
the zoom lens satisfying the following conditional formulae:

$$1.48 < Nd1n < 1.70 \quad (1')$$

$$1.621 < Nd1p < 1.650 \quad (2')$$

$$19 < vd1p < 24 \quad (3'')$$

$$0.2 < d2/fw < 0.5 \quad (4)$$

wherein Nd1n is the refractive index of the first lens with respect to the d line, Nd1p and vd1p are the refractive index and the Abbe's number of the second lens with respect to the d line, respectively, d2 is the spatial distance between the first lens and the second lens along an optical axis, and fw is the focal length of the entire system at the wide angle end.

2. A zoom lens as defined in claim 1, wherein:
the second lens group comprises only one negative lens; and
the negative lens is a plastic lens.

3. A zoom lens as defined in claim 1, wherein:
the second lens group is constituted by two positive lenses and one negative lens.

4. A zoom lens as defined in claim 1 that practically only comprises the first lens group and the second lens group.

5. An imaging apparatus comprising a zoom lens as defined in claim 1.

6. A zoom lens as defined in claim 1, wherein:
the second lens group comprises at least one negative lens that satisfies the following conditional formulae:

$$1.60 < Nd2n < 1.70 \quad (6)$$

$$20.0 < vd2n < 28.0 \quad (7)$$

wherein Nd2n and vd2n are the refractive index and the Abbe's number of the negative lens with respect to the d line.

7. A zoom lens as defined in claim 6 that satisfies the following conditional formula:

$$20.0 < d2n < 1.69 \quad (6').$$

8. A zoom lens as defined in claim 1 that satisfies the following conditional formula:

$$0.5 < (Rpr+Rpf)/(Rpr-Rpf) < 6.2 \quad (8)$$

wherein Rpf is the paraxial radius of curvature of the surface of the plastic lens having the positive refractive power provided in the first lens group toward the object side, and Rpr is the paraxial radius of curvature of the surface of the plastic lens having the positive refractive power provided in the first lens group toward the image side.

9. A zoom lens as defined in claim 8 that satisfies the following conditional formula:

$$1.6 < (Rpr+Rpf)/(Rpr-Rpf) < 6.1 \quad (8').$$

* * * * *